US011522693B2

(12) United States Patent
Nakatsuru et al.

(10) Patent No.: US 11,522,693 B2
(45) Date of Patent: Dec. 6, 2022

(54) INFORMATION PROCESSING DEVICE AND INFORMATION PROCESSING METHOD

(71) Applicant: SONY CORPORATION, Tokyo (JP)

(72) Inventors: Tsutomu Nakatsuru, Tokyo (JP); Katsuya Shimoji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/964,582

(22) PCT Filed: Jan. 11, 2019

(86) PCT No.: PCT/JP2019/000750
§ 371 (c)(1),
(2) Date: Jul. 23, 2020

(87) PCT Pub. No.: WO2019/155821
PCT Pub. Date: Aug. 15, 2019

(65) Prior Publication Data
US 2021/0044434 A1    Feb. 11, 2021

(30) Foreign Application Priority Data

Feb. 6, 2018   (JP) .............................. JP2018-018895

(51) Int. Cl.
*H04L 9/08*     (2006.01)
*H04L 9/14*     (2006.01)
*H04L 9/32*     (2006.01)

(52) U.S. Cl.
CPC .......... *H04L 9/0866* (2013.01); *H04L 9/0822* (2013.01); *H04L 9/14* (2013.01); *H04L 9/32* (2013.01)

(58) Field of Classification Search
CPC ....... H04L 9/0866; H04L 9/0822; H04L 9/14; H04L 9/32; H04L 9/3226
See application file for complete search history.

(56) References Cited

U.S. PATENT DOCUMENTS

2011/0016317 A1\* 1/2011 Abe ...................... H04L 9/3273
713/169
2014/0351911 A1\* 11/2014 Yang ................... H04L 63/0807
726/7

(Continued)

FOREIGN PATENT DOCUMENTS

CN      101958795 A     1/2011
CN      107408080 A    11/2017
(Continued)

OTHER PUBLICATIONS

International Search Report and Written Opinion of PCT Application No. PCT/JP2019/000750, dated Apr. 5, 2019, 12 pages of ISRWO.

*Primary Examiner* — Abiy Getachew
(74) *Attorney, Agent, or Firm* — Chip Law Group

(57) ABSTRACT

There is provided an information processing device, including a processing unit configured to perform a calculation using keys assigned to a plurality of areas of a recording medium and generate an authentication key. The processing unit generates the authentication key by performing a calculation using conversion values corresponding to the keys, the conversion values being obtained by converting device-specific information using conversion methods associated with the keys used in the calculation.

17 Claims, 12 Drawing Sheets

(56) References Cited

U.S. PATENT DOCUMENTS

2016/0283405 A1 9/2016 Oh et al.
2017/0118641 A1* 4/2017 Ishibashi ............... H04L 9/0897

FOREIGN PATENT DOCUMENTS

| EP | 3274849 A1 | 1/2018 |
| JP | 2000-036021 A | 2/2000 |
| JP | 2011-022785 A | 2/2011 |
| JP | 2017-085225 A | 5/2017 |
| WO | 2016/160129 A1 | 10/2016 |

* cited by examiner

[FIG. 1]
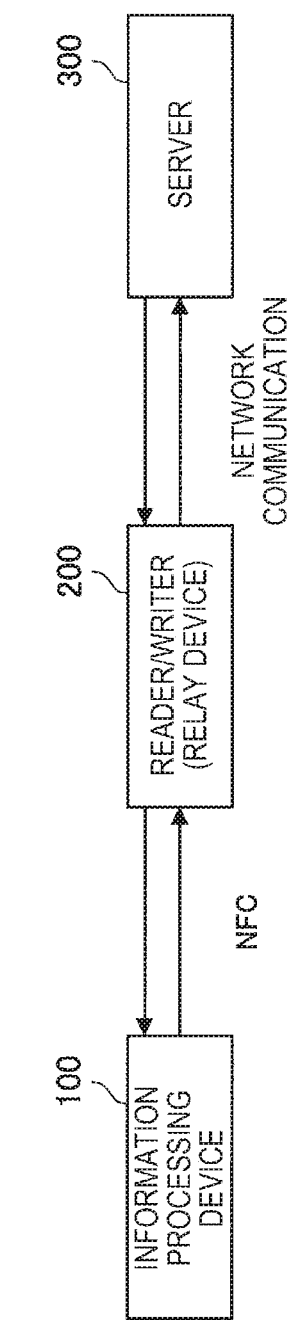

[FIG. 2]
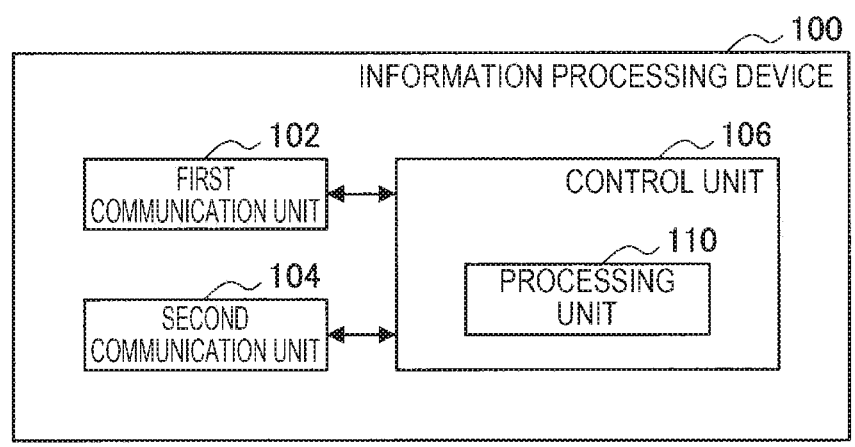

[FIG. 3]
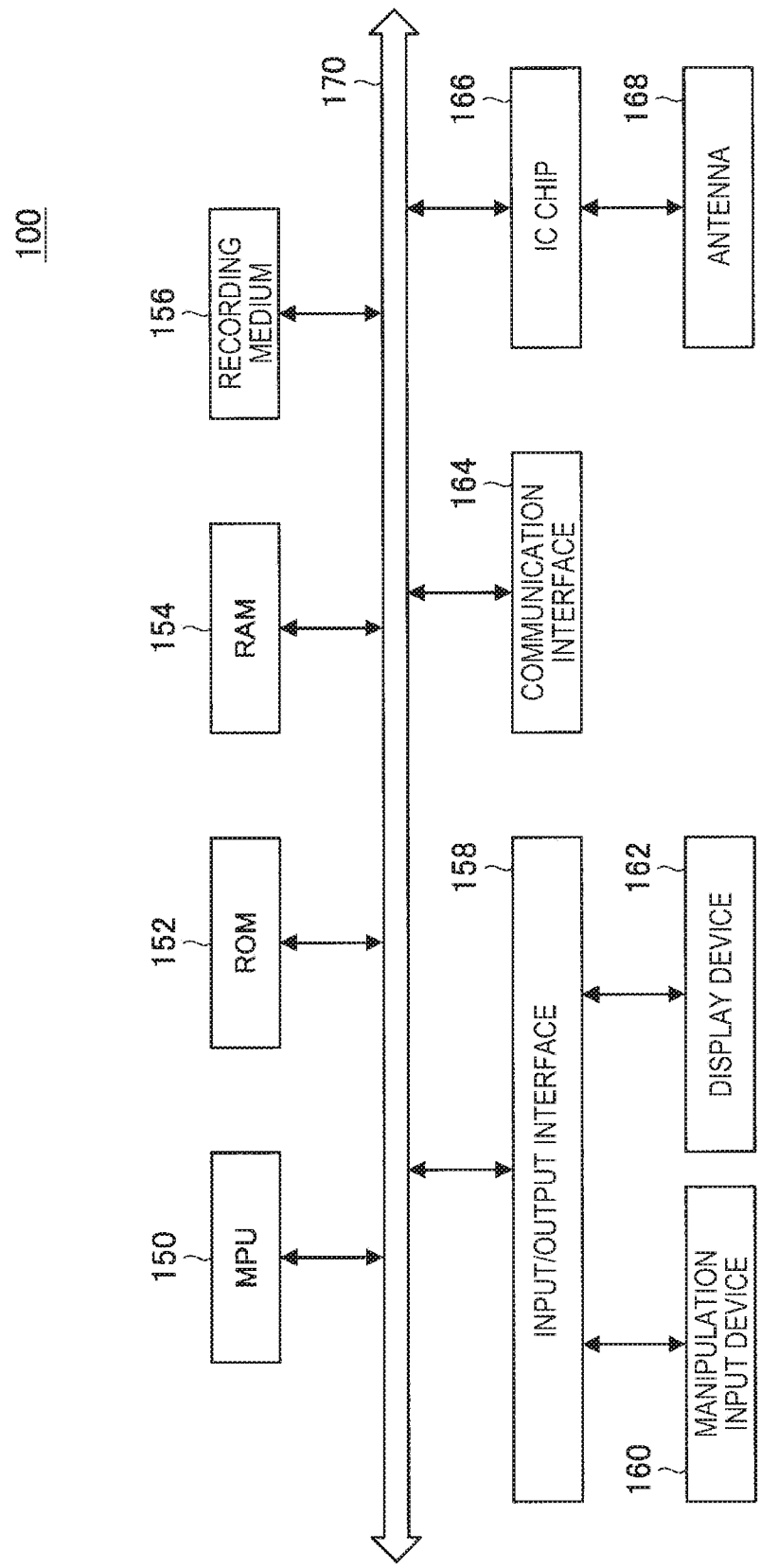

[FIG. 4]
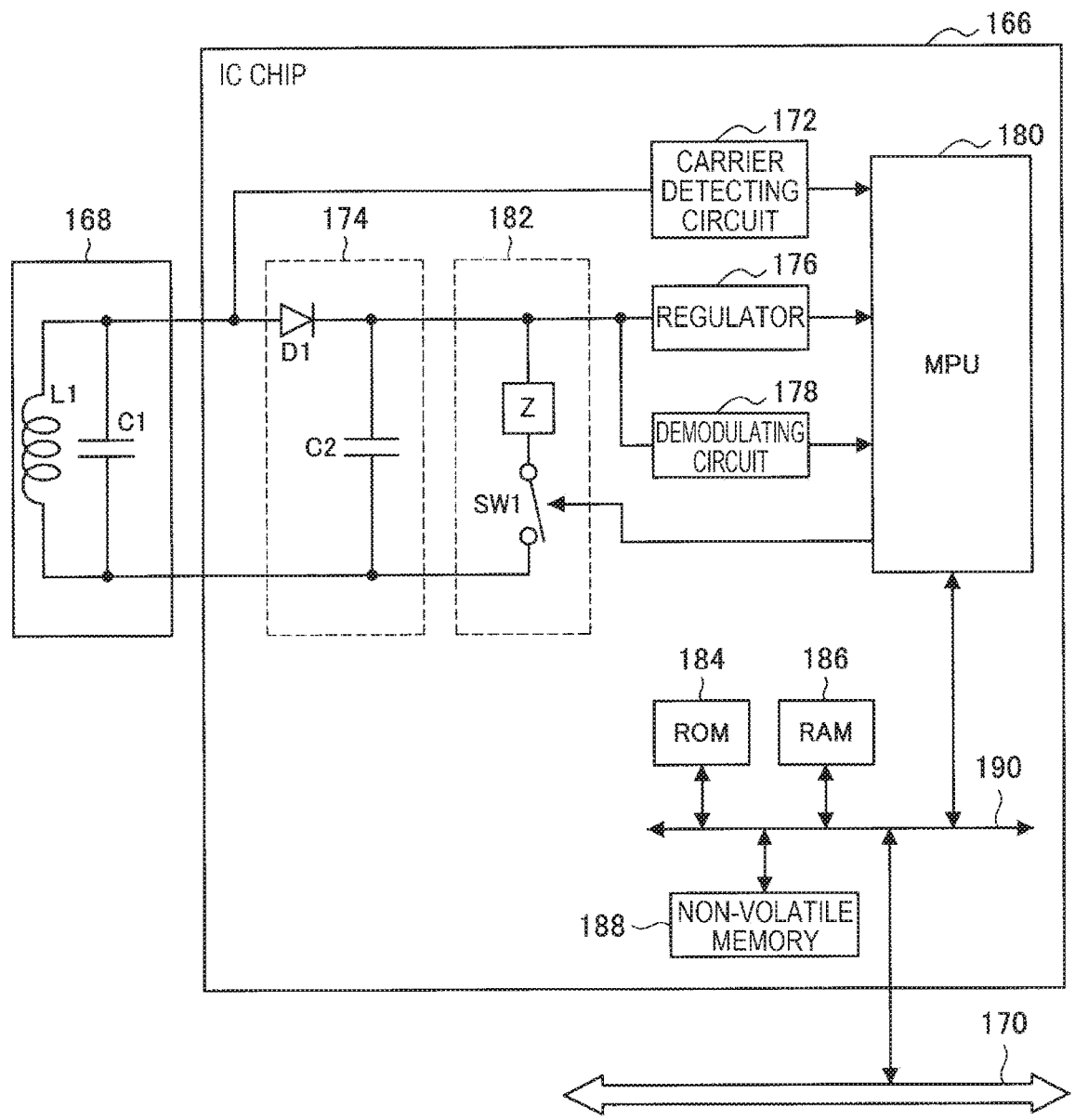

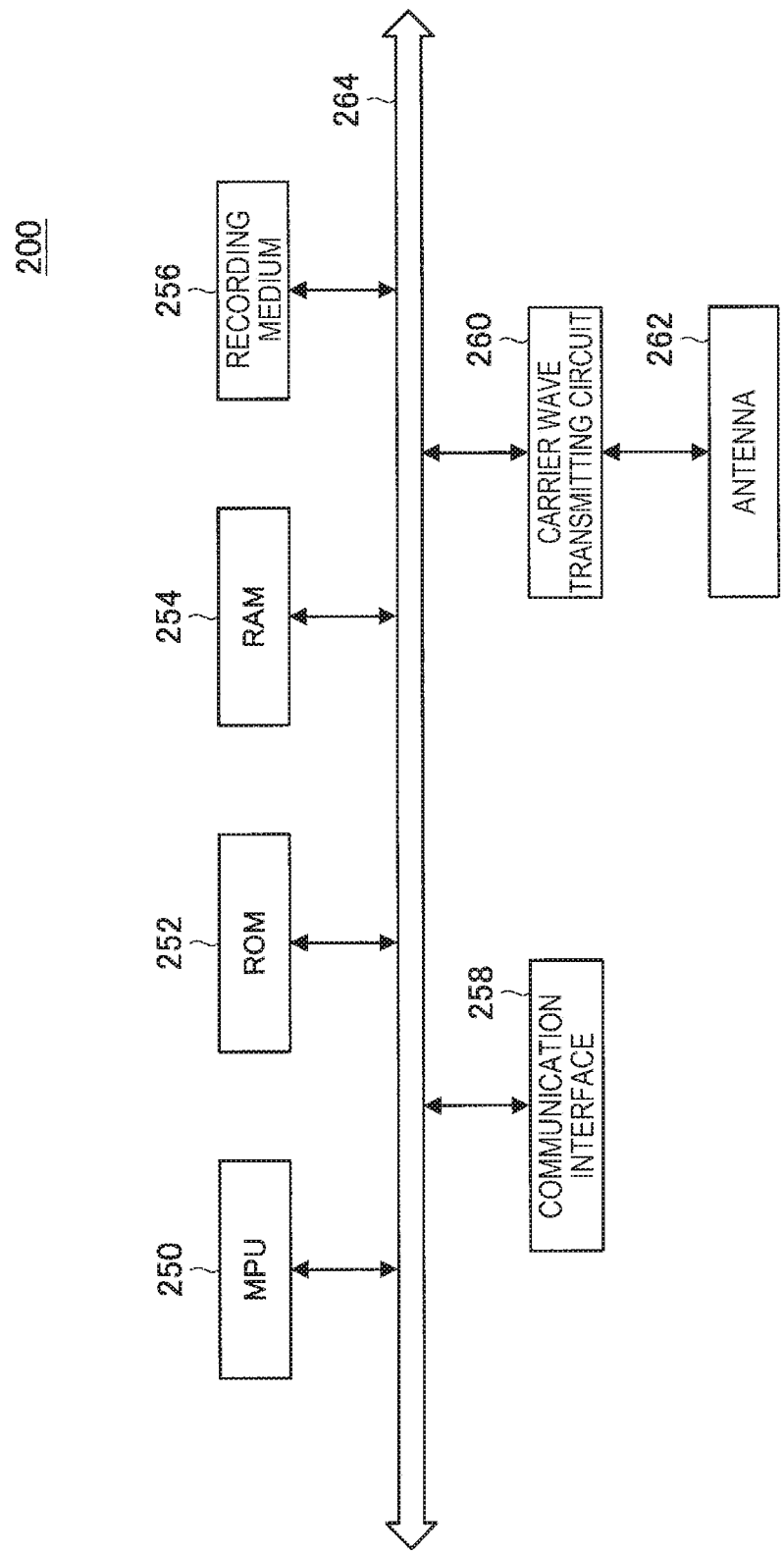

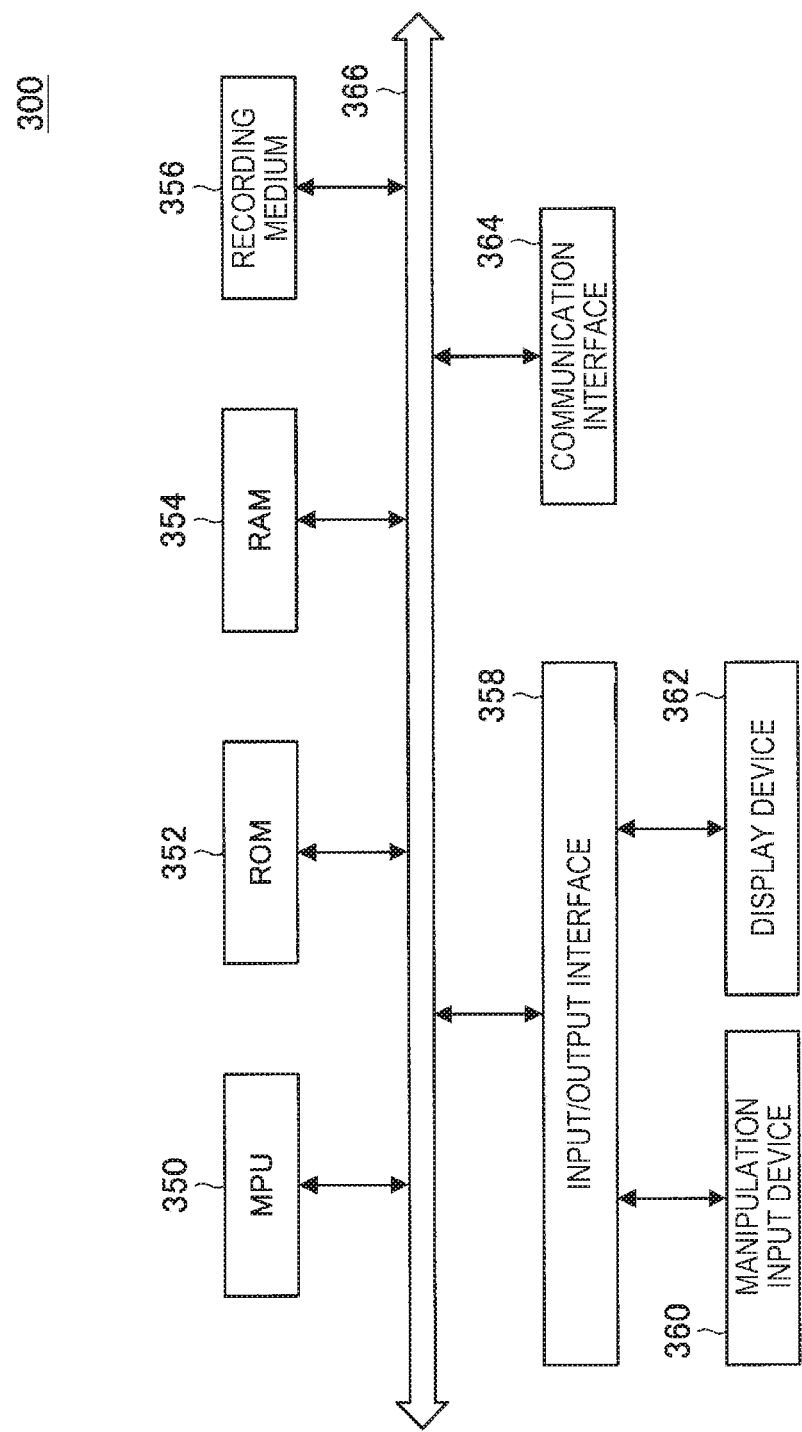
[FIG. 6]

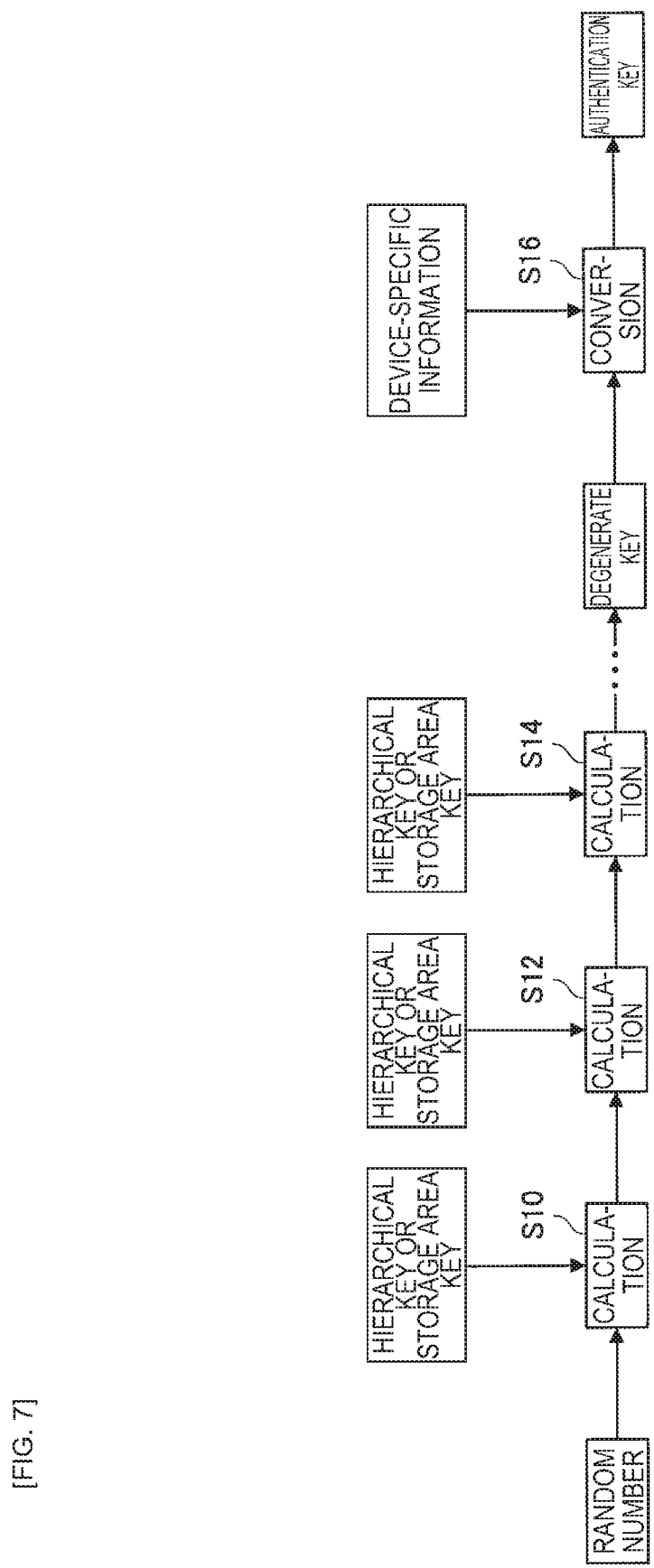

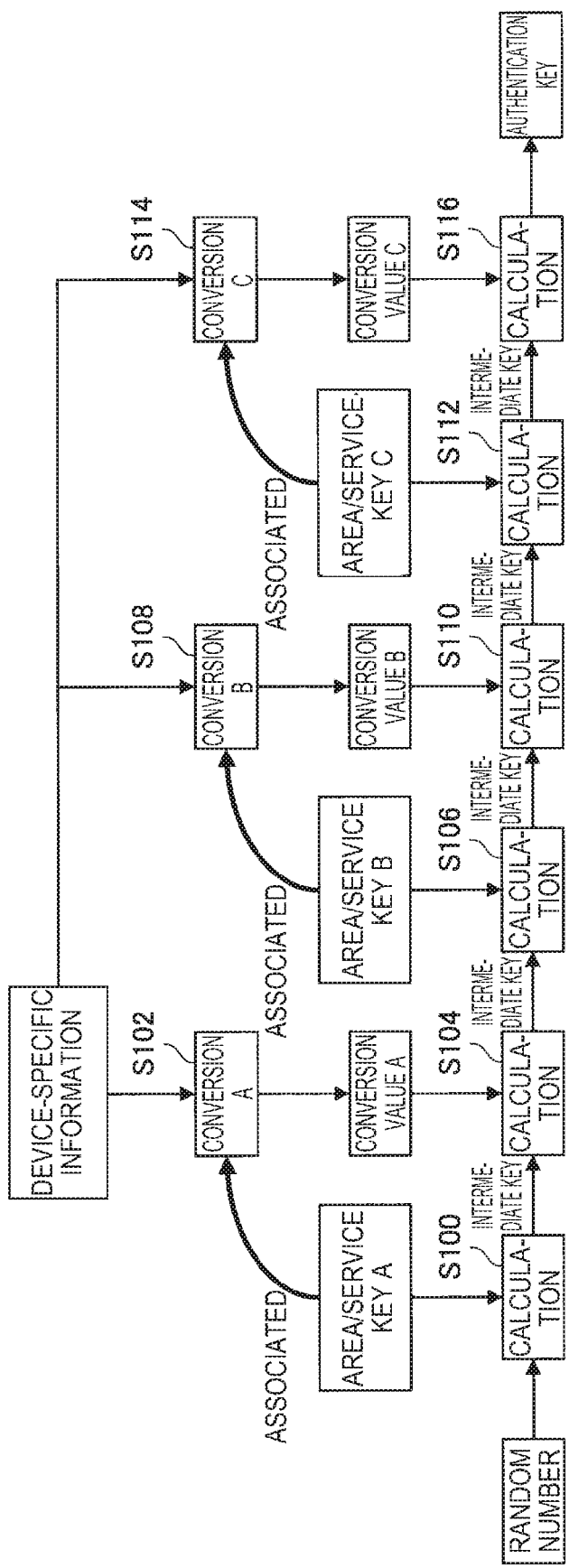
[FIG. 8]

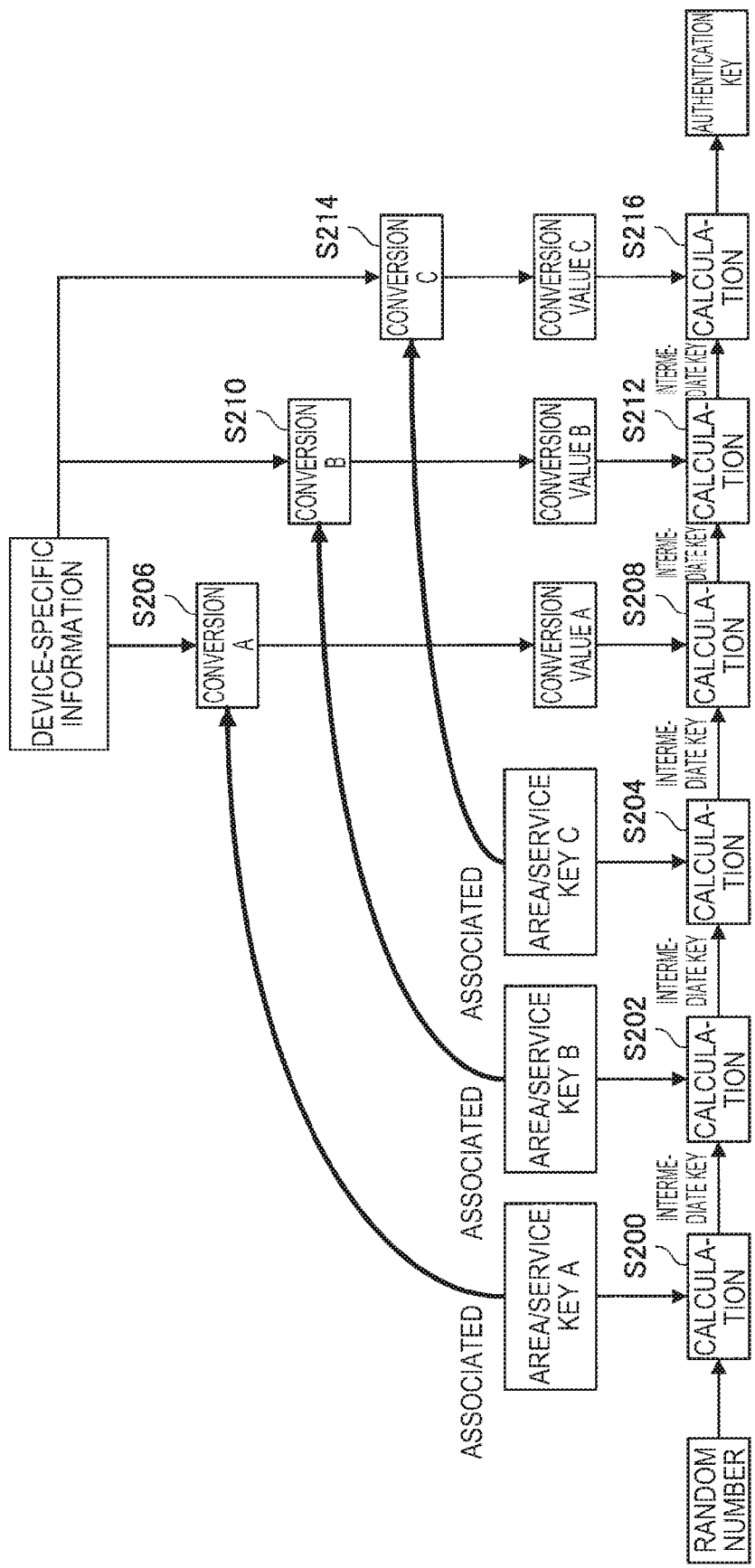
[FIG. 9]

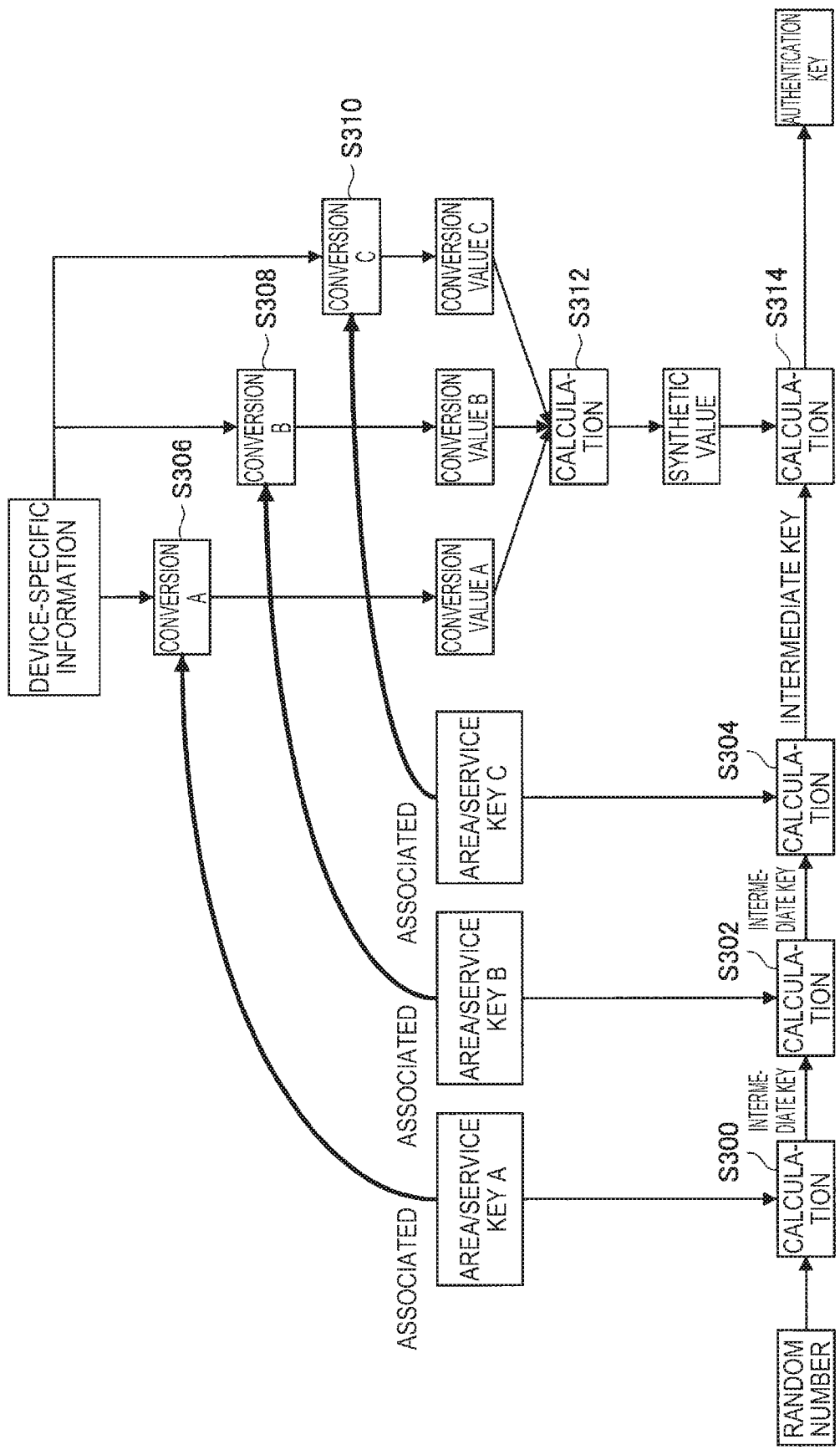
[FIG. 10]

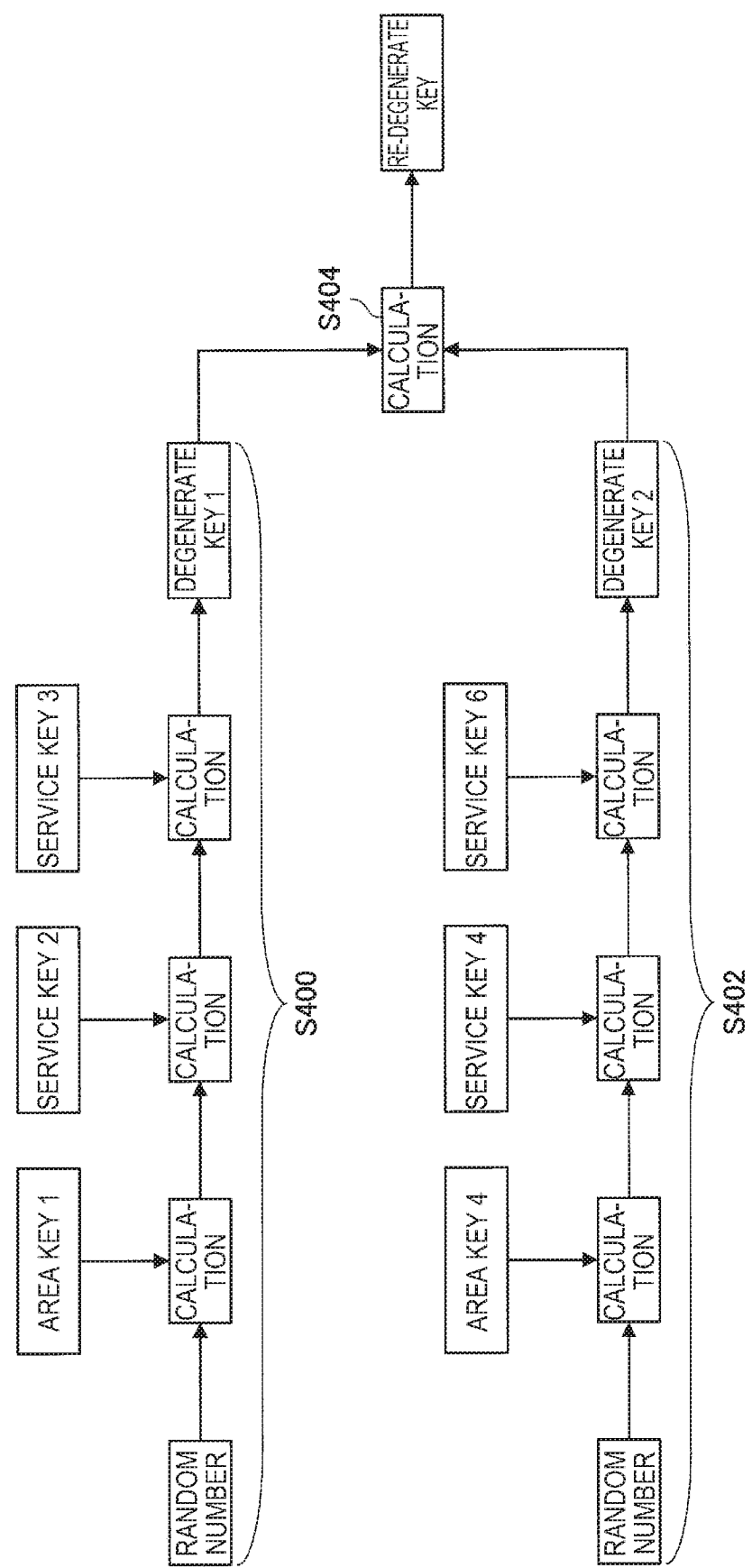
[FIG. 11]

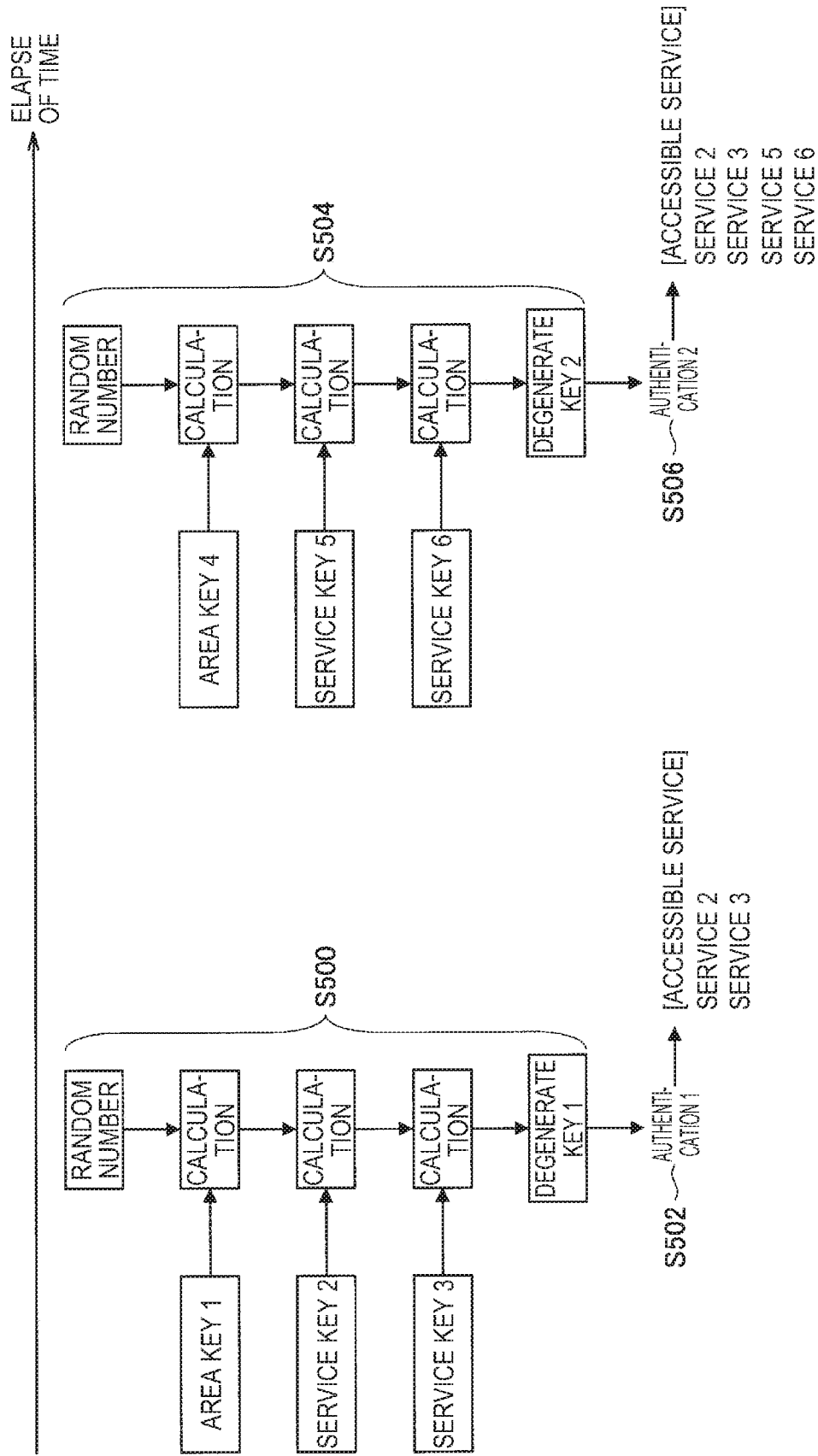

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/000750 filed on Jan. 11, 2019, which claims priority benefit of Japanese Patent Application No. JP 2018-018895 filed in the Japan Patent Office on Feb. 6, 2018. Each of the above-referenced applications is hereby incorporated herein by reference in its entirety.

TECHNICAL FIELD

The present disclosure relates to an information processing device, an information processing method, and a program.

BACKGROUND ART

A technique for managing resources of data storage devices such as IC cards has been developed. As the above technique, for example, there is a technique described in Patent Literature 1 below.

CITATION LIST

Patent Literature

[PTL 1]
JP 2000-36021A

SUMMARY

Technical Problem

For example, there are devices which are required to perform authentication using an authentication key in order to access an area, data, or the like of a recording medium.

The present disclosure proposes an information processing device, an information processing method, and a program which are novel and improved and capable of improving the convenience of authentication using an authentication key.

Solution to Problem

According to an embodiment of the present disclosure, there is provided an information processing device, including: a processing unit configured to perform a calculation using keys assigned to a plurality of areas of a recording medium and generate an authentication key. The processing unit generates the authentication key by performing a calculation using conversion values corresponding to the keys, the conversion values being obtained by converting device-specific information using conversion methods associated with the keys used in the calculation.

In addition, according to an embodiment of the present disclosure, there is provided an information processing device, including: a processing unit configured to generate an authentication key used in an authentication process and perform the authentication process using the generated authentication key. The processing unit generates a plurality of first degenerate keys obtained by synthesizing a plurality of keys assigned to areas of a recording medium, generates a second degenerate key obtained by synthesizing the plurality of generated first degenerate keys, and performs the authentication process using the second degenerate key as the authentication key.

In addition, according to an embodiment of the present disclosure, there is provided an information processing device, including: a processing unit configured to perform an authentication process using a degenerate key obtained by synthesizing a plurality of keys assigned to areas of a recording medium as an authentication key and control execution of a process related to a service authenticated in the authentication process. In a case in which the authentication process is performed a plurality of times, the processing unit causes the process related to the service authenticated in any one of the authentication processes to be executable.

In addition, according to an embodiment of the present disclosure, there is provided an information processing method executed by an information processing device, including: performing a calculation using keys assigned to a plurality of areas of a recording medium and generating an authentication key. In the generating of an authentication key, the authentication key is generated by performing a calculation using conversion values corresponding to the keys, the conversion values being obtained by converting device-specific information using conversion methods associated with the keys used in the calculation.

In addition, according to an embodiment of the present disclosure, there is provided an information processing method executed by an information processing device, including: generating an authentication key used in an authentication process; and performing the authentication process using the generated authentication key. In the generating of an authentication key, a plurality of first degenerate keys obtained by synthesizing a plurality of keys assigned to areas of a recording medium are generated, and a second degenerate key obtained by synthesizing the plurality of generated first degenerate keys is generated, and in the performing of the authentication process, the authentication process is performed using the second degenerate key as the authentication key.

In addition, according to an embodiment of the present disclosure, there is provided an information processing method executed by an information processing device, including: performing an authentication process using a degenerate key obtained by synthesizing a plurality of keys assigned to areas of a recording medium as an authentication key; and controlling execution of a process related to a service authenticated in the authentication process. In a case in which the authentication process is performed a plurality of times, in the controlling of execution, the process related to the service authenticated in any one of the authentication processes is caused to be executable.

In addition, according to an embodiment of the present disclosure, there is provided a program causing a computer to implement: a function of performing a calculation using keys assigned to a plurality of areas of a recording medium and generating an authentication key. The function of generating the authentication key includes generating the authentication key by performing a calculation using conversion values corresponding to the keys, the conversion values being obtained by converting device-specific information using conversion methods associated with the keys used in the calculation.

In addition, according to an embodiment of the present disclosure, there is provided a program causing a computer to implement: a function of generating an authentication key used in an authentication process; and a function of performing the authentication process using the generated authentication key. The generating function includes generating a plurality of first degenerate keys obtained by synthesizing a plurality of keys assigned to areas of a recording medium, and generating a second degenerate key obtained by synthesizing the plurality of generated first degenerate keys, and the function of performing the authentication process includes performing the authentication process using the second degenerate key as the authentication key.

In addition, according to an embodiment of the present disclosure, there is provided a program causing a computer to implement: a function of performing an authentication process using a degenerate key obtained by synthesizing a plurality of keys assigned to areas of a recording medium as an authentication key; and a function of controlling execution of a process related to a service authenticated in the authentication process. In a case in which the authentication process is performed a plurality of times, the function of controlling execution includes causing the process related to the service authenticated in any one of the authentication processes to be executable.

Advantageous Effects of Invention

According to an embodiment of the present disclosure, it is possible to improve the convenience of authentication using an authentication key.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram illustrating an example of a configuration of an information processing system according to the present embodiment.

FIG. 2 is a functional block diagram illustrating an example of a configuration of an information processing device according to the present embodiment.

FIG. 3 is an explanatory diagram illustrating an example of a hardware configuration of an information processing device according to the present embodiment.

FIG. 4 is an explanatory diagram illustrating an example of a configuration of an IC chip and an antenna illustrated in FIG. 3.

FIG. 5 is an explanatory diagram illustrating an example of a hardware configuration of a reader/writer (relay device) according to the present embodiment.

FIG. 6 is an explanatory diagram illustrating an example of a hardware configuration of a server according to the present embodiment.

FIG. 7 is an explanatory diagram used for describing an information processing method according to the present embodiment.

FIG. 8 is an explanatory diagram illustrating a first generation example of an authentication key related to an information processing method according to a first embodiment.

FIG. 9 is an explanatory diagram illustrating a second generation example of the authentication key related to the information processing method according to the first embodiment.

FIG. 10 is an explanatory diagram illustrating a third generation example of the authentication key related to the information processing method according to the first embodiment.

FIG. 11 is an explanatory diagram illustrating a generation example of an authentication key related to an information processing method according to a second embodiment.

FIG. 12 is an explanatory diagram for describing a process according to an information processing method according to a third embodiment.

DESCRIPTION OF EMBODIMENTS

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the following description will proceed in the order described below.

1. Information processing system according to the present embodiment and information processing method according to the present embodiment (1) Configuration of information processing system according to the present embodiment (1-1) Information processing device 100

(1-2) Reader/writer 200 (relay device)

(1-3) Server 300

(1-4) Application example of each device constituting information processing system according to the present embodiment (2) Process according to information processing method according to the present embodiment (2-1) Information processing method according to first embodiment (2-2) Information processing method according to second embodiment (2-3) Information processing method according to third embodiment (2-4) Information processing method in accordance with other embodiments 2. Program according to the present embodiment (Information Processing System According to the Present Embodiment and Information Processing Method According to the Present Embodiment)

Hereinafter, an example of an information processing system according to the present embodiment will be described first, and then an information processing method according to the present embodiment will be described using a case applied to the information processing system according to the present embodiment as an example.

(1) Configuration of Information Processing System According to the Present Embodiment FIG. 1 is an explanatory diagram illustrating an example of a configuration of an information processing system 1000 according to the present embodiment. The information processing system 1000 includes, for example, an information processing device 100, a reader/writer 200 (relay device), and a server 300.

Further, the configuration of the information processing system according to the present embodiment is not limited to the example illustrated in FIG. 1. For example, the information processing system according to the present embodiment may include a plurality of information processing devices 100. Further, the information processing system according to the present embodiment may include a plurality of readers/writers 200 or a plurality of servers 300.

The information processing device 100 and the reader/writer 200 perform communication via, for example, near field communication (NFC) of Type-A, Type-B, Type-F, or the like.

Further, in the information processing system according to the present embodiment, for example, the information processing device 100 and the reader/writer 200 may perform communication in accordance with "wireless communication of an arbitrary communication scheme such as wireless communication using IEEE 802.15.1 such as Bluetooth low energy (BLE), wireless communication using IEEE 802.11, or infrared communication" or "wired communication using communication via a communication interface or the like based on a Universal Serial Bus (USB) or ISO 7816 standard."

The server 300 and the reader/writer 200 are connected, for example, via a network in a wireless or wired manner, and perform communication by communication via a network (hereinafter referred to as "network communication"). Examples of the network according to the present embodiment include a wired network such as a local area network (LAN) or a wide area network (WAN), a wireless network such as a wireless local area network (WLAN), and the Internet using a communication protocol such as Transmission Control Protocol/Internet Protocol (TCP/IP).

Further, in the information processing system according to the present embodiment, the server 300 and the reader/writer 200 can also communicate directly with each other without going through the network.

The server 300 and the information processing device 100 perform communication via the reader/writer 200. In other words, in the information processing system 1000, the reader/writer 200 serves as a relay device that relays communication between the server 300 and the information processing device 100.

Further, in the information processing system according to the present embodiment, the server 300 and the information processing device 100 can also communicate with each other without going through the reader/writer 200. In a case in which the information processing system according to the present embodiment has a "configuration in which the server 300 and the information processing device 100 communicate directly without going through the reader/writer 200," for example, the server 300 may have a function of the reader/writer 200. In other words, the information processing system according to the present embodiment may not have a device serving as a relay device such as the reader/writer 200.

Hereinafter, a case in which the "information processing device 100 and the reader/writer 200 perform communication in accordance with NFC, and the server 300 and the reader/writer 200 perform communication in accordance with the network communication" as illustrated in FIG. 1 will be described as an example. Further, as described above, examples of the communication in the information processing system according to the present embodiment are not limited to the example illustrated in FIG. 1.

(1-1) Information Processing Device 100

FIG. 2 is a functional block diagram illustrating an example of a configuration of the information processing device 100 according to the present embodiment.

The information processing device 100 includes, for example, a first communication unit 102, a second communication unit 104, and a control unit 106.

Further, the information processing device 100 may include, for example, a read only memory (ROM) (not illustrated), a random access memory (RAM) (not illustrated), a manipulating unit (not illustrated) which can be manipulated by a user of the information processing device 100, a display unit (not illustrated) that displays various screens on a display screen, and the like. For example, the respective components of the information processing device 100 are connected with one another via a bus serving as a data transmission path.

The ROM (not illustrated) stores a program and control data such as calculation parameters which are used by the control unit 106. The RAM (not illustrated) temporarily stores a program executed by the control unit 106 and the like.

A manipulation input device illustrated in a hardware configuration example of the information processing device 100 to be described later can be used as the manipulating unit (not illustrated). Further, a display device illustrated in a hardware configuration example of the information processing device 100 to be described later can be used as the display unit (not illustrated).

(Example of Hardware Configuration of Information Processing Device 100)

FIG. 3 is an explanatory diagram illustrating an example of a hardware configuration of the information processing device 100 according to the present embodiment. FIG. 3 illustrates an example of a hardware configuration of the information processing device 100 in a case in which communication with the reader/writer 200 is performed in accordance with NFC.

The information processing device 100 includes, for example, an MPU 150, a ROM 152, a RAM 154, a recording medium 156, an input/output interface 158, a manipulation input device 160, a display device 162, a communication interface 164, an IC chip 166, and an antenna 168. Further, for example, the respective components of the information processing device 100 are connected with one another via a bus 170 serving as a data transmission path. Further, the information processing device 100 is driven by, for example, electric power supplied from an internal power source such as a battery included in the information processing device 100, electric power supplied from a connected external power source, or the like.

The MPU 150 is constituted by one or more processors constituted by a micro processing unit (MPU) or the like, various kinds of processing circuits, or the like, and functions as the control unit 106 that controls the information processing device 100 in general. Further, in the information processing device 100, the MPU 150 also functions as, for example, a processing unit 110 to be described later.

The ROM 152 stores a program, control data such as calculation parameters, and the like which are used by the MPU 150. The RAM 154 temporarily stores, for example, a program or the like executed by the MPU 150.

The recording medium 156 is a single recording medium functioning as a storage unit (not illustrated). The recording medium 156 stores, for example, various types of data such as various kinds of applications. Here, examples of the recording medium 156 include a magnetic recording medium such as a hard disk and a non-volatile memory such as a flash memory. Further, the recording medium 156 may be removable from the information processing device 100.

The input/output interface 158 connects, for example, the manipulation input device 160 or the display device 162. The manipulation input device 160 functions as a manipulating unit (not illustrated), and the display device 162 functions as a display unit (not illustrated). Here, examples of the input/output interface 158 include a Universal Serial Bus (USB) terminal, a digital visual interface (DVI) terminal, a high-definition multimedia interface (HDMI) (registered trademark) terminal, and various kinds of processing circuits.

Further, for example, the manipulation input device 160 is installed on the information processing device 100 and is connected with the input/output interface 158 in the information processing device 100. For example, a button, a direction key, a rotary type selector such as a jog dial, or a combination thereof can be used as the manipulation input device 160.

Further, for example, the display device 162 is installed on the information processing device 100 and is connected with the input/output interface 158 in the information processing device 100. For example, a liquid crystal display, an organic EL display, or the like can be used as the display device 162.

Further, it will be appreciated that the input/output interface 158 can be connected to an external device such as an external manipulation input device (for example, a keyboard or a mouse) or an external display device serving as an external device of the information processing device 100. Further, for example, the display device 162 may be a device on which display and a user manipulation can be performed such as a touch screen.

The communication interface 164 is a communication device for performing communication of one communication scheme supported by the information processing device 100 and functions as the first communication unit 102. Here, for example, a communication antenna and a radio frequency (RF) circuit (wireless communication), an IEEE 802.15.1 port and a transceiving circuit (wireless communication), an IEEE 802.11 port and a transceiving circuit (wireless communication), a LAN terminal and a transceiving circuit (wired communication), or the like can be used as the communication interface 164.

The IC chip 166 and the antenna 168 are communication devices that perform communication of other communication schemes supported by the information processing device 100 and function as the second communication unit 104. For example, the IC chip 166 and the antenna 168 perform NFC communication with an external device having a reader/writer function such as the reader/writer 200 through carrier waves of a predetermined frequency such as 13.56 MHz.

The antenna 168 plays a role of receiving carrier waves and transmitting a response signal. Further, the IC chip 166 demodulates and processes a carrier wave signal transmitted from an external device such as the reader/writer 200 on the basis of received carrier waves, and causes the response signal to be transmitted through load modulation.

FIG. 4 is an explanatory diagram illustrating an example of a configuration of the IC chip 166 and the antenna 168 illustrated in FIG. 3. Further, for example, the information processing device 100 may not have a configuration of the IC chip 166 illustrated in FIG. 3 in the form of an IC chip.

The antenna 168 is constituted by a resonance circuit including, for example, a coil (inductor) L1 having a predetermined inductance and a capacitor C1 having a predetermined capacitance, and generates an inductive voltage through electromagnetic induction in response to the reception of the carrier wave. Further, the antenna 168 outputs a reception voltage obtained by resonating the inductive voltage at a predetermined resonance frequency. Here, the resonance frequency of the antenna 168 is set in accordance with a frequency of the carrier wave such as, for example, 13.56 MHz. The antenna 168 receives the carrier wave through the above configuration and transmits a response signal through load modulation performed in a load modulation circuit 182 of the IC chip 166.

The IC chip 166 includes, for example, a carrier detecting circuit 172, a detecting circuit 174, a regulator 176, a demodulating circuit 178, an MPU 180, and a load modulation circuit 182. Further, although not illustrated in FIG. 4, the IC chip 166 may further include, for example, a protection circuit (not illustrated) for preventing an overvoltage or an overcurrent from being applied to the MPU 180. Here, for example, a clamp circuit or the like constituted by a diode or the like can be used as the protection circuit (not illustrated).

Further, the IC chip 166 includes, for example, a ROM 184, a RAM 186, and a non-volatile memory 188. For example, the MPU 180, the ROM 184, the RAM 186, and the non-volatile memory 188 are connected via a bus 190 as a data transmission path. Further, the bus 190 is connected to the bus 170.

The ROM 184 stores a program and control data such as calculation parameters which are used by the MPU 180. The RAM 186 temporarily stores a program executed by the MPU 180, a calculation result, an execution state, or the like.

The non-volatile memory 188 is another recording medium functioning as a storage unit (not illustrated). The non-volatile memory 188 stores various types of data such as, for example, "data related to an information processing method in the information processing device 100 such as key information (described later) or setting information (described later)," an electronic value (currency or data having a value corresponding to currency), data corresponding to various kinds of services, and various kinds of applications. The key information according to the present embodiment is data which is used in authentication in communication of an arbitrary communication scheme such as NFC (including authentication for accessing an area of a recording medium), processes related to arbitrary encryption/decryption, or the like. Hereinafter, a key used for authentication among the key information is referred to as an "authentication key." Further, the authentication key according to the present embodiment and the key used for encryption or decryption may be the same key or may be different keys. In other words, the key indicated by the key information according to the present embodiment may undertake either or both of the authentication key and the key used for encryption or decryption.

Here, examples of the non-volatile memory 188 include an electrically erasable and programmable read only memory (EEPROM), a flash memory, and the like. The non-volatile memory 188, for example, has tamper resistance and corresponds to an example of a secure recording medium.

The carrier detecting circuit 172 generates, for example, a rectangular detection signal on the basis of a reception voltage transferred from the antenna 168, and transmits the detection signal to the MPU 180. Further, for example, the MPU 180 uses the transferred detection signal as a process clock for data processing. Here, since the detection signal is a signal based on the reception voltage transferred from the antenna 168, the detection signal is synchronized with a frequency of the carrier wave transmitted from an external device such as the reader/writer 200. Therefore, since the carrier detecting circuit 172 is installed, the IC chip 166 can perform a process with an external device such as the reader/writer 200 in synchronization with an external device.

The detecting circuit 174 rectifies the reception voltage output from the antenna 168. Here, the detecting circuit 174 includes, for example, a diode D1 and a capacitor C2.

The regulator 176 smooths the reception voltage to be a constant voltage, and outputs a drive voltage to the MPU 180. Here, the regulator 176 uses a DC component of the reception voltage as the driving voltage.

The demodulating circuit 178 demodulates the carrier wave signal on the basis of the reception voltage and outputs data (for example, a binary data signal of a high level and a low level) corresponding to the carrier wave signal included in the carrier wave. Here, the demodulating circuit 178 outputs an AC component of the reception voltage as data.

The MPU 180 is driven using the drive voltage output from the regulator 176 as electric power and processes the data demodulated in the demodulating circuit 178. Here, the MPU 180 includes one or more processors constituted by a calculating circuit such as, for example, an MPU, various kinds of processing circuits, or the like.

Further, the MPU 180 generates a control signal for controlling the load modulation related to a response to an external device such as the reader/writer 200 in accordance with a processing result. Then, the MPU 180 outputs the control signal to the load modulation circuit 182.

The load modulation circuit 182 includes, for example, a load Z and a switch SW1, and selectively connects (activates) the load Z in accordance with the control signal transferred from the MPU 180 and performs the load modulation. Here, the load Z includes, for example, a resistor having a predetermined resistance value. Further, the switch SW1 is constituted by, for example, a p-channel metal oxide semiconductor field effect transistor (MOSFET) or an n-channel MOSFET.

With the above configuration, the IC chip 166 processes the carrier wave signal received by the antenna 168 and causes the antenna 168 to transmit the response signal through the load modulation.

The IC chip 166 and the antenna 168 have, for example, the configuration illustrated in FIG. 4, and perform NFC communication with an external device such as the reader/writer 200 or the like using carrier waves of a predetermined frequency. Further, it will be appreciated that the configuration of the IC chip 166 and the antenna 168 according to the present embodiment is not limited to the example illustrated in FIG. 4.

The information processing device 100 communicates with an external device such as the reader/writer 200, for example, with the hardware configuration illustrated in FIG. 3. Further, the information processing device 100 performs the process according to the information processing method in the information processing device 100 to be described later, for example, with the hardware configuration illustrated in FIG. 3. Further, the hardware configuration of the information processing device 100 according to the present embodiment is not limited to the configuration illustrated in FIG. 3.

For example, in a case in which communication with an external device is performed via an external communication device having a function and configuration similar to those of the communication interface 164, or in a case in which communication of one communication scheme described above is not performed, the information processing device 100 may not include the communication interface 164.

Further, for example, in a case in which communication with an external device is performed via an external communication device having a function and configuration similar to those of the IC chip 166 and the antenna 168, the information processing device 100 may not include the IC chip 166 and the antenna 168.

Further, in a case in which communication with an external device is performed in accordance with a communication scheme other than NFC such as wireless communication using IEEE 802.15.1, the information processing device 100 may not include the IC chip 166 and the antenna 168. In the case of the above example, the information processing device 100 performs communication with an external device through a communication device that supports a communication scheme other than NFC or an external communication device that supports a communication scheme other than NFC.

Further, the information processing device 100 may have a configuration in which, for example, some or all of the recording medium 156, the manipulation input device 160, and the display device 162 are not included.

Further, for example, the information processing device 100 can have a hardware configuration according to an application example of the information processing device 100 to be described later. As an example, for example, in a case in which the information processing device 100 is an IC card, the information processing device 100 may be constituted by the IC chip 166 and the antenna 168. In a case in which the information processing device 100 is an IC card, for example, the MPU 180 constituting the IC chip 166 performs the process according to the information processing method in the information processing device 100 to be described later.

Further, for example, the configuration illustrated in FIG. 3 (or a configuration in accordance with a modified example) may be realized by one or two or more integrated circuits (ICs).

An example of a configuration of the information processing device 100 will be described with reference back to FIG. 2. The first communication unit 102 communicates with an external device in accordance with communication of one communication scheme. For example, the communication in the first communication unit 102 is controlled by the control unit 106.

Here, for example, a communication antenna and an RF circuit (wireless communication), an IEEE 802.15.1 port and a transceiving circuit (wireless communication), an IEEE 802.11 port and a transceiving circuit (wireless communication), a LAN terminal and a transceiving circuit (wired communication), or the like can be used as the first communication unit 102.

The second communication unit 104 communicates with an external device in accordance with communication of another communication scheme. For example, the communication in the second communication unit 104 is controlled by the control unit 106.

Here, for example, a communication device that supports NFC such as the IC chip 166 and the antenna 168 illustrated in FIG. 3 can be used as the second communication unit 104. Further, as described above, the second communication unit 104 may be a communication device that supports a communication scheme other than NFC such as, for example, wireless communication using IEEE 802.15.1.

The control unit 106 is constituted by, for example, an MPU or the like and plays a role of controlling the information processing device 100 in general. Further, the control unit 106 includes, for example, the processing unit 110 and plays a leading role in performing the process according to the information processing method in the information processing device 100 to be described later.

The processing unit 110 plays a leading role in processing the process according to the information processing method in the information processing device 100. An example of the process according to the information processing method in the information processing device 100 will be described in each of embodiments to be described later.

Further, the configuration of the information processing device according to the present embodiment is not limited to the configuration illustrated in FIG. 2.

For example, the information processing device according to the present embodiment may include the processing unit 110 illustrated in FIG. 2 separately from the control unit 106 (which is realized by, for example, another processing circuit).

Further, the configuration of the information processing device according to the present embodiment is not limited to the configuration illustrated in FIG. 2, and it is possible to employ a configuration corresponding to a way of separating the process according to the information processing method in the information processing device 100 to be described later.

Further, for example, in a case in which communication with an external device is performed via an external communication device having a function and configuration similar to those of the first communication unit 102 or in a case in which it is a configuration in which communication of one communication scheme described above is not performed, the information processing device according to the present embodiment may not include the first communication unit 102.

Further, for example, in a case in which communication with an external device is performed via an external communication device having a function and configuration similar to those of the second communication unit 104, the information processing device according to the present embodiment may not include the second communication unit 104.

(1-2) Reader/Writer 200 (Relay Device)

The reader/writer 200 (relay device) is a device serving as a relay device that relays communication between the server 300 and the information processing device 100.

(Hardware Configuration Example of Reader/Writer 200)

FIG. 5 is an explanatory diagram illustrating an example of a hardware configuration of the reader/writer 200 (relay device) according to the present embodiment.

The reader/writer 200 includes, for example, an MPU 250, a ROM 252, a RAM 254, a recording medium 256, a communication interface 258, a carrier wave transmitting circuit 260, and an antenna 262. Further, for example, the respective components of the reader/writer 200 are connected with one another via a bus 264 serving as a data transmission path. Further, the reader/writer 200 is driven by, for example, electric power supplied from an internal power source such as a battery included in the reader/writer 200, electric power supplied from a connected external power source, or the like.

The MPU 250 is constituted by one or more processors constituted by a calculating circuit such as, for example, an MPU, various kinds of processing circuits, or the like, and functions as a control unit (not illustrated) that controls the reader/writer 200 in general.

The ROM 252 stores a program, control data such as calculation parameters, and the like which are used by the MPU 250. The RAM 254 temporarily stores, for example, a program or the like executed by the MPU 250.

The recording medium 256 functions as a storage unit (not illustrated) and stores various types of data such as, for example, various kinds of applications. Here, examples of the recording medium 256 include a magnetic recording medium such as a hard disk and a non-volatile memory such as a flash memory. Further, the recording medium 256 may be detachable from the reader/writer 200.

The communication interface 258 is a communication device which performs communication of one communication scheme supported by the reader/writer 200 and functions as a first communication unit (not illustrated) that performs communication with an external device such as the server 300 in a wireless or wired manner via a network (or directly). Here, for example, a communication antenna and an RF circuit (wireless communication), an IEEE 802.15.1 port and a transceiving circuit (wireless communication), an IEEE 802.11 port and a transceiving circuit (wireless communication), a LAN terminal and a transceiving circuit (wired communication), or the like can be used as the communication interface 258. Further, the communication interface 258 may be an arbitrary configuration corresponding to the network according to the present embodiment.

The carrier wave transmitting circuit 260 and the antenna 262 are a communication device that performs communication of other communication schemes supported in the reader/writer 200, and function as a second communication unit (not illustrated) that performs communication with an external device such as the information processing device 100 in a wireless or wired manner.

The antenna 262 is constituted by, for example, a resonance circuit including a coil having a predetermined inductance serving as a transceiving antenna and a capacitor having a predetermined capacitance and a demodulating circuit. Further, the antenna 262 receives carrier waves of a predetermined frequency such as, for example, 13.56 MHz, and demodulates data or the like transmitted through the load modulation or the like from an external device such as the information processing device 100. Further, for example, in a case in which the carrier wave transmitting circuit 260 includes a demodulating circuit, the antenna 262 may be constituted by a resonance circuit.

The carrier wave transmitting circuit 260 includes, for example, a modulating circuit that performs modulation such as amplitude shift keying (ASK) and an amplifying circuit that amplifies an output of the modulating circuit, and causes carrier waves carrying the carrier wave signal from the transceiving antenna of the antenna 262 to be transmitted. Further, the carrier wave transmitting circuit 260 may include a demodulating circuit that demodulates a signal received by the antenna 262, for example. For example, the demodulating circuit performs envelope detection of an amplitude change in a voltage between the modulating circuit (or the amplifying circuit) and the resonance circuit of the antenna 262, binarizes the detected signal, and demodulates the signal received by the antenna 262. Further, the demodulating circuit can demodulate the signal received by the antenna 262, for example, by using a phase change in the voltage between the modulating circuit (or the amplifying circuit) and the resonance circuit of the antenna 262.

Since the carrier wave transmitting circuit 260 is installed, the reader/writer 200 has an initiator function in NFC and undertakes a so-called reader/writer. Here, various signals such as, for example, a polling signal and a signal indicating various kinds of requests such as a read request can be used as the carrier wave signal transmitted from the antenna 262 by the carrier wave transmitting circuit 260. Further, for example, the carrier wave transmitting circuit 260 controls the transmission of the carrier wave by the MPU 250.

The reader/writer 200 has, for example, the hardware configuration illustrated in FIG. 5 and thus undertakes a relay device. Further, the hardware configuration of the reader/writer 200 according to the present embodiment is not limited to the configuration illustrated in FIG. 5.

For example, the reader/writer 200 may not include the communication interface 258 in a case in which communication with an external device is performed via an external communication device having a function similar to that of the communication interface 258.

Further, the reader/writer 200 may not include the carrier wave transmitting circuit 260 and the antenna 262 in a case in which communication with an external device is performed via an external communication device having functions similar to those of the carrier wave transmitting circuit 260 and the antenna 262.

Further, the reader/writer 200 may not include the carrier wave transmitting circuit 260 and the antenna 262 in a case in which communication with an external device is performed in accordance with a communication scheme other than NFC such as wireless communication using IEEE 802.15.1. In the case of the above example, the reader/writer 200 performs communication with an external device through a communication device that supports a communication scheme other than NFC or an external communication device that supports a communication scheme other than NFC.

Further, the reader/writer 200 may have a configuration in which, for example, the recording medium 256 is not included.

Further, for example, the reader/writer 200 can have a hardware configuration according to an application example of the reader/writer 200 to be described later.

Further, for example, the configuration illustrated in FIG. 5 (or a configuration in accordance with a modified example) may be realized by one or two or more integrated circuits (ICs).

(1-3) Server 300

The server 300 is a device that communicates with the information processing device 100 via the reader/writer 200 (or directly). The server 300 can perform various processes such as a payment process using, for example, an electronic value by communicating with the information processing device 100.

(Hardware Configuration Example of Server 300)

FIG. 6 is an explanatory diagram illustrating an example of a hardware configuration of the server 300 according to the present embodiment. The server 300 includes, for example, an MPU 350, a ROM 352, a RAM 354, a recording medium 356, an input/output interface 358, a manipulation input device 360, a display device 362, and a communication interface 364. Further, for example, the respective components of the server 300 are connected with one another via a bus 366 serving as a data transmission path. Further, the server 300 is driven by, for example, electric power supplied from an internal power source such as a battery included in the server 300, electric power supplied from a connected external power source, or the like.

The MPU 350 is constituted by one or more processors constituted by a calculating circuit such as, for example, an MPU, various kinds of processing circuits, or the like, and functions as a control unit (not illustrated) that controls the server 300 in general.

The ROM 352 stores a program, control data such as calculation parameters, and the like which are used by the MPU 350. The RAM 354 temporarily stores, for example, a program executed by the MPU 350.

The recording medium 356 functions as a storage unit (not illustrated), and stores various types of data such as, for example, data related to the information processing method in the server 300 or various kinds of applications. Here, examples of the recording medium 356 include a magnetic recording medium such as a hard disk and a non-volatile memory such as a flash memory. Further, the recording medium 356 may be removable from the server 300.

The input/output interface 358 connects, for example, the manipulation input device 360 or the display device 362. The manipulation input device 360 functions as a manipulating unit (not illustrated), and the display device 362 functions as a display unit (not illustrated). Here, examples of the input/output interface 358 include a USB terminal, a DVI terminal, an HDMI (registered trademark) terminal, and various kinds of processing circuits.

Further, for example, the manipulation input device 360 is installed on the server 300 and is connected with the input/output interface 358 in the server 300. For example, a button, a direction key, a rotary type selector such as a jog dial, a combination thereof, or the like can be used as the manipulation input device 360.

Further, for example, the display device 362 is installed on the server 300 and is connected with the input/output interface 358 in the server 300. For example, a liquid crystal display or an organic EL display can be used as the display device 362.

Further, it will be appreciated that the input/output interface 358 can be connected to an external device such as a manipulation input device (for example, a keyboard, a mouse, or the like) outside the server 300 or an external display device. Further, the display device 362 may be a device on which display and a user manipulation can be performed such as a touch screen.

The communication interface 364 is a communication device for performing communication of one communication scheme supported by the server 300, and functions as a communication unit (not illustrated) for performing wireless or wired communication with an external device such as the reader/writer 200 via a network (or directly). Here, for example, a communication antenna and an RF circuit (wireless communication), an IEEE 802.15.1 port and a transceiving circuit (wireless communication), an IEEE 802.11 port and a transceiving circuit (wireless communication), a LAN terminal and a transceiving circuit (wired communication), or the like can be used as the communication interface 164. Further, the communication interface 364 may be an arbitrary configuration corresponding to the network according to the present embodiment.

The server 300 performs various processes such as settlement processing, for example, by the hardware configuration illustrated in FIG. 6. Further, the hardware configuration of the server 300 according to the present embodiment is not limited to the configuration illustrated in FIG. 6.

For example, in a case in which communication with an external device or the like is performed via a connected external communication device, the server 300 may not include the communication interface 364. Further, the communication interface 364 may have a configuration capable of performing communication with one or more external devices or the like in accordance with a plurality of communication schemes.

Further, the server 300 may have a configuration in which, for example, some or all of the recording medium 356, the manipulation input device 360, and the display device 362 are not included.

Further, for example, the server 300 can have a hardware configuration according to an application example of the server 300 to be described later.

Further, for example, a part or all of the hardware configuration illustrated in FIG. 6 (or a configuration according to a modified example) may be realized by one or two or more ICs.

(1-4) Application Example of Each Device Constituting Information Processing System According to the Present Embodiment Although the information processing device 100 has been described above as a component of the information processing system according to the present embodiment, the present embodiment is not limited to such a form. The present embodiment can be applied to various devices capable of performing the process according to the information processing method in the information processing device 100 (to be described later) such as, for example, a "communication device such as a smart phone," an "IC card," a "tablet type device," or a "game machine." Further, the present embodiment can also be applied to a processing IC which can be incorporated into, for example, the devices mentioned above.

Further, although the reader/writer 200 (relay device) has been described as a component of the information processing system according to the present embodiment, the present embodiment is not limited to such a form. For example, the present embodiment can be applied to an arbitrary device having a function of relaying communication between devices such as a "reader/writer," a "device with a reader/writer function," and a "communication device that performs communication in accordance with wireless communication using IEEE 802.15.1 such as BLE," or the like. Further, the present embodiment can also be applied to a processing IC which can be incorporated into, for example, the devices mentioned above.

Further, although the server 300 has been described as a component of the information processing system according to the present embodiment, the present embodiment is not limited to such a form. The present embodiment can be applied to various devices such as a "computer such as a personal computer (PC) or a server," a "tablet type device," a "communication device such as a smart phone," a "game machine," and the like. Further, the present embodiment can also be applied to a processing IC which can be incorporated into, for example, the devices mentioned above.

(2) Information Processing Method According to the Present Embodiment

Next, the process according to the information processing method according to the present embodiment will be described using the information processing system 1000 illustrated in FIG. 1 as an example.

(2-1) Information Processing Method According to the First Embodiment (2-1-1) Overview of Information Processing System 1000 to which Information Processing Method According to First Embodiment is Applied For example, the followings are stated in Patent Literature 1:
  an authentication key is generated using a plurality of hierarchical keys or storage area keys: and
  the authentication key is converted on the basis of device specific information, and authentication is performed using a conversion result.

FIG. 7 is an explanatory diagram used for describing the information processing method according to the present embodiment and schematically illustrates the authentication key described in Patent Literature 1.

For example, as illustrated in steps S10, S12, S14, . . . illustrated in FIG. 7, in the technique disclosed in Patent Literature 1, a degenerate key which can undertake an authentication key is generated, for example, by performing a calculation using a plurality of hierarchical keys or storage area keys on a value serving as a basis such as a random number. The degenerate key is generated, for example, by sequentially performing encryption using each key on the value serving as the basis.

Further, as illustrated in step S16 in FIG. 7, in the technique disclosed in Patent Literature 1, the degenerate key is converted on the basis of device-specific information which is device-specific data such as a manufacturing ID, and a conversion result is used as the authentication key. In the technique disclosed in Patent Literature 1, the degenerate key is converted, for example, by performing XOR between the degenerate key and the device-specific information or by performing encryption using the device-specific information as the key on the degenerate key.

For example, as illustrated in FIG. 7, as the degenerate key is converted using the device-specific information, the authentication key differs for each device, and thus security can be improved.

Here, when the authentication key is converted using the device-specific information as in the technique disclosed in Patent Literature 1, a conversion method is generally kept secret. One of the reasons why the conversion method is kept secret is, for example, because reverse conversion can be performed if the conversion method is known in a case in which conversion is performed in accordance with a common key encryption scheme.

In a case in which a recording medium installed in one device includes areas of a plurality of business operators or in a case in which the secret of the conversion method leaks from one business operator, it affects all the other business operators. Therefore, it is technically possible to share the secret of the conversion method among a plurality of business operators, but it is practically difficult.

In this regard, the information processing device 100 to which the information processing method according to the first embodiment is applied implements "generating the authentication key on the basis of the device-specific information without sharing the secret of the conversion method between the business operators."

Since the authentication key is generated on the basis of the device-specific information and thus the authentication key differs for each device, the security can be improved. Further, as the authentication key is generated on the basis of the device-specific information without sharing the secret of the conversion method between the business operators, it is possible to reduce the influence when the secret of the conversion method leaks, and thus it is possible to improve the "convenience of the authentication using the authentication key in "each business operator and each user of the information processing device 100" as compared with a case in which the existing technique is used.

Therefore, the information processing device 100 to which the information processing method according to the first embodiment is applied can improve the convenience of the authentication using the authentication key.

(2-1-2) Process According to Information Processing Method in Information Processing Device 100 According to the First Embodiment Next, an example of the process according to the information processing method in the information processing device 100 according to the first embodiment will be described.

The information processing device 100 performs a calculation using a key assigned to each of a plurality of areas of the recording medium and generates the authentication key. Examples of the area of the recording medium according to the present embodiment include an area of a recording medium installed in the information processing device 100 such as the non-volatile memory 188 illustrated in FIG. 4 and an area of an external recording medium which is accessible by the information processing device 100 (the same applies hereafter).

As the key related to the present embodiment, for example, either or both of an area key for permitting access to a specific area of a recording medium and a service key for permitting access to specific data stored in an area of a recording medium can be used. Further, the key according to the present embodiment is not limited to the example described above but may be, for example, the hierarchical key described in Patent Literature 1.

In this specification, there are cases in which an "area" indicates, for example, an "area" in a file system of FeliCa (registered trademark) OS. In this case, an "area" corresponds to a directory (or folder).

Further, in this specification, there are cases in which a "service" indicates, for example, a "service" in a file system of FeliCa (registered trademark) OS. In this case, a "service" corresponds to data (or a file) for providing a predetermined service.

As the calculation using the key according to the present embodiment, for example, encryption according to an arbitrary encryption scheme can be used.

Further, when the authentication key is generated, the information processing device 100 performs a calculation using a "conversion value corresponding to the key used in a calculation."

Encryption according to an arbitrary encryption scheme can be used as a calculation using a conversion value according to the present embodiment.

The conversion value corresponding to the key according to the present embodiment is a value obtained by converting the device-specific information using a conversion method associated with each key used in a calculation. As the device-specific information in the present embodiment, for example, data specific to the information processing device 100 such as a manufacturing ID stored in an arbitrary recording medium installed in the information processing device 100 can be used.

The information processing device 100 specifies a conversion method associated with each key, for example, on the basis of setting information associated with the area of the recording medium.

The setting information according to the present embodiment is data indicating a setting related to the area of the recording medium.

As the setting information, for example, a "table (or a database) in which an address indicating the area of the recording medium, a key, and data indicating the conversion method are recorded in association with each area" can be used. As the data indicating the conversion method, for example, data indicating a conversion algorithm which uses at least the device-specific information as an input can be used. The conversion methods associated with each key may be all the same, or a plurality of conversion methods may be included.

For example, as the conversion method stored in the setting information, for example, an arbitrary algorithm capable of converting a value indicated by the device-specific information into another value can be used.

Further, the conversion method according to the present embodiment is not limited to the example described above. For example, the conversion method according to the present embodiment may include not converting the device-specific information into another value.

For example, in a case in which the conversion method associated with one key indicates that the device-specific information is not converted, the information processing device 100 does not perform a calculation using the conversion value corresponding to one key.

Hereinafter, a generation example of the authentication key according to the information processing method according to the first embodiment will be described.

(A) First Generation Example of Authentication Key According to First Embodiment FIG. 8 is an explanatory diagram illustrating a first generation example of the authentication key according to the information processing method according to the first embodiment.

An "area/service key A" illustrated in FIG. 8 indicates an area key or a service key which is assigned to an area A in the recording medium such as the non-volatile memory 188. Further, an "area/service key B" illustrated in FIG. 8 indicates an area key or a service key which is assigned to an area B in the recording medium such as the non-volatile memory 188, and an "area/service key C" illustrated in FIG. 8 indicates an area key or a service key which is assigned to an area C in the recording medium such as the non-volatile memory 188. In other words, the "area/service key" illustrated in FIG. 8 is an example of the key assigned to each area. Hereinafter, the same applies to the other drawings.

Further, a "random number" illustrated in FIG. 8 is an example of a value serving as the basis of the authentication key. Further, it will be appreciated that the value serving as the basis of the authentication key according to the present embodiment, including the examples illustrated in FIGS. 9 to 12 to be described later, is not limited to a random number. The following description will proceed with a case in which the value serving as the basis of the authentication key is a random number.

The information processing device 100 performs a calculation using a random number and the key assigned to the area A (S100). Hereinafter, a calculation result of the calculation performed in the authentication key generation process such as a calculation result of step S100 is referred to as an "intermediate key."

The information processing device 100 converts the device-specific information using a conversion method A associated with the key assigned to the area A used in step S100 and obtains a conversion value A (S102).

The information processing device 100 performs a calculation using the intermediate key obtained in the process of step S100 and the conversion value A (S104).

The information processing device 100 performs a calculation using the intermediate key obtained in the process of step S104 and the key assigned to the area B (S106).

The information processing device 100 converts the device-specific information using a conversion method B associated with the key assigned to the area B used in step S106 and obtains a conversion value B (S108).

The information processing device 100 performs a calculation using the intermediate key obtained in the process of step S106 and the conversion value B (S110).

The information processing device 100 performs a calculation using the intermediate key obtained in the process of step S110 and the key assigned to the area C (S112).

The information processing device 100 converts the device-specific information using a conversion method C associated with the key assigned to the area C used in step S112 and obtains a conversion value C (S114).

The information processing device 100 performs a calculation using the intermediate key obtained in the process of step S114 and the conversion value C (S116). In the example illustrated in FIG. 8, a result of the process in step S116 corresponds to the authentication key.

For example, as illustrated in FIG. 8, the information processing device 100 generates the authentication key by performing a calculation using the conversion value corresponding to the key used in the performed calculation each time the calculation using the key is performed. The conversion value used in the first generation example of the authentication key is a value obtained by performing conversion using the conversion method associated with each key used in each calculation using the key. Therefore, in the first generation example of the authentication key illustrated in FIG. 8, there is not necessary to share the secret of the conversion method among the business operators in order to generate the authentication key.

Therefore, in the first generation example of the authentication key illustrated in FIG. 8, "generating the authentication key based on the device-specific information without sharing the secret of the conversion method among the business operators" is realized.

Further, the first generation example of the authentication key according to the first embodiment is not limited to the example illustrated in FIG. 8.

For example, in the example illustrated in FIG. 8, an example in which the calculation using the key is sequentially performed three times is illustrated, but the number of calculations performed using the key may be an arbitrary number which is two or more.

Further, as described above, the conversion method according to the present embodiment may include not converting the device-specific information into another value. Further, in a case in which the conversion method associated with one key indicates that the device-specific information is not converted, the information processing device 100 may not perform a calculation using the conversion value corresponding to one key.

(B) Second Generation Example of Authentication Key According to First Embodiment FIG. 9 is an explanatory diagram illustrating a second generation example of the authentication key according to the information processing method according to the first embodiment.

The information processing device 100 performs a calculation using a random number and the key assigned to the area A (S200).

The information processing device 100 performs a calculation using an intermediate key obtained in the process of step S200 and the key assigned to the area B (S202).

The information processing device 100 performs a calculation using an intermediate key obtained in the process of step S202 and the key assigned to the area C (S204). The result of sequentially performing the calculations using the keys illustrated in steps S200 to S204 corresponds to, for example, a degenerate key in which a plurality of keys are synthesized.

The information processing device 100 converts the device-specific information using the conversion method A associated with the key assigned to the area A used in step S200 and obtains the conversion value A (S206).

The information processing device 100 performs a calculation using an intermediate key obtained in the process of step S204 and the conversion value A (S208).

The information processing device 100 converts the device-specific information using the conversion method B associated with the key assigned to the area B used in step S202 and obtains the conversion value B (S210).

The information processing device 100 performs a calculation using an intermediate key obtained in the process of step S208 and the conversion value B (S212).

The information processing device 100 converts the device-specific information using the conversion method C associated with the key assigned to the area C used in step S204 and obtains the conversion value C (S214).

The information processing device 100 performs a calculation using an intermediate key obtained in the process of step S212 and the conversion value C (S216). In the example illustrated in FIG. 9, a process result of step S216 corresponds to the authentication key.

For example, as illustrated in FIG. 9, the information processing device 100 generates the authentication key by performing the calculation using the key and then performing the calculation using the conversion value corresponding to each key. The conversion value used in the second generation example of the authentication key is a value obtained by performing conversion using the conversion method associated with each key used in each calculation using the key, similarly to the first generation example of the authentication key illustrated in FIG. 8. Therefore, in the second generation example of the authentication key illustrated in FIG. 9, there is not necessary to share the secret of the conversion method among the business operators in order to generate the authentication key. Therefore, in the second generation example of the authentication key illustrated in FIG. 9, "generating the authentication key based on the device-specific information without sharing the secret of the conversion method among the business operators" is realized.

Further, the second generation example of the authentication key according to the first embodiment is not limited to the example illustrated in FIG. 9.

In the second generation example of the authentication key, for example, similarly to the first generation example of the authentication key, the calculation using the key may be performed an arbitrary number of times which is twice or more. Further, in the second generation example of the authentication key, similarly to the first generation example of the authentication key, for example, in a case in which the conversion method associated with one key indicates that the device-specific information is not converted, a calculation using the conversion value corresponding to one key may not be performed.

(C) Third Generation Example of Authentication Key According to First Embodiment FIG. 10 is an explanatory diagram illustrating a third generation example of the authentication key according to the information processing method according to the first embodiment.

The information processing device 100 performs a calculation using a random number and the key assigned to the area A (S300).

The information processing device 100 performs a calculation using an intermediate key obtained in the process of step S300 and the key assigned to the area B (S302).

The information processing device 100 performs a calculation using an intermediate key obtained in the process of step S302 and the key assigned to the area C (S304). The result of sequentially performing the calculations using the keys illustrated in steps S300 to S304 corresponds to, for example, a degenerate key in which a plurality of keys are synthesized.

The information processing device 100 converts the device-specific information using the conversion method A associated with the key assigned to the area A used in step S300 and obtains the conversion value A (S306).

The information processing device 100 converts the device-specific information using the conversion method B associated with the key assigned to the area B used in step S302 and obtains the conversion value B (S308).

The information processing device 100 converts the device-specific information using the conversion method C associated with the key assigned to the area C used in step S304 and obtains the conversion value C (S310).

The information processing device 100 performs an arbitrary calculation capable of generating one value from the conversion value A, the conversion value B, and the conversion value C, and calculates one value on the basis of the conversion value A, the conversion value B, and the conversion value C (S312). Here, one value generated in the process in step S312 corresponds to a synthetic value obtained by synthesizing the conversion value A, the conversion value B, and the conversion value C.

The information processing device 100 performs a calculation using an intermediate key obtained in the process of step S304 and the synthetic value obtained in the process of step S312 (S314). Here, since the synthetic value is a value based on the conversion value A, the conversion value B, and the conversion value C, the process of step S314 corresponds to an example of a calculation using the conversion values respectively corresponding to a plurality of keys. Further, in the example illustrated in FIG. 10, the process result of step S314 corresponds to the authentication key.

For example, as illustrated in FIG. 10, the information processing device 100 generates the authentication key by performing the calculation using the key and then performing the calculation using the synthetic value obtained by synthesizing the conversion values corresponding to the respective keys. The synthetic value used in the third generation example of the authentication key is a value obtained by synthesizing the conversion values obtained by performing conversion using the conversion methods associated with the keys used in the respective calculations. Therefore, in the third generation example of the authentication key illustrated in FIG. 10, there is not necessary to share the secret of the conversion method among the business operators in order to generate the authentication key. Therefore, in the third generation example of the authentication key illustrated in FIG. 10, "generating the authentication key based on the device-specific information without sharing the secret of the conversion method among the business operators" is realized.

Further, the third generation example of the authentication key according to the first embodiment is not limited to the example illustrated in FIG. 10.

In the third generation example of the authentication key, for example, similarly to the first generation example of the authentication key, the calculation using the key may be performed an arbitrary number of times which is twice or more. Further, in the third generation example of the authentication key, similarly to the first generation example of the authentication key, for example, in a case in which the conversion method associated with one key indicates that the device-specific information is not converted, a calculation using the conversion value corresponding to one key may not be performed.

(2-2) Information Processing Method According to Second Embodiment (2-2-1) Overview of Information Processing System 1000 to which Information Processing Method According to the Second Embodiment is Applied For example, the followings are stated in Patent Literature 1:

a degenerate key is generated using a plurality of area keys or service keys, and authenticate is performed using the degenerate key Here, in a case in which the degenerate key different from the area key and the service key is used in authentication as in the technique disclosed in Patent Literature 1, since it is sufficient to store only the degenerate key in the reader/writer, the security of the entire system is improved.

However, in a case in which the authentication is performed using the degenerate key according to the technique disclosed in Patent Literature 1, a service accessible in a device is limited to a service corresponding to the service key used for generating the degenerate key. Further, in a case in which the authentication using the degenerate key according to the technique disclosed in Patent Literature 1 is performed twice or more, only a service corresponding to the degenerate key used in the last authentication is accessible.

Further, in general, a business operator (reader/writer business operator) who develops and installs a reader/writer receives the disclosure of the degenerate key from an administrator (service provider) of the area key and the service key. Then, in a case in which the reader/writer performs writing to a plurality of services respectively managed by a plurality of service providers, since the number of degenerate keys is two or more, the authentication is performed twice or more.

Here, among devices supporting NFC such as an IC card, there are devices which are capable of performing writing to a plurality of services at the same time in response to a single writing command and have a feature capable of guaranteeing atomicity of processes. However, in the existing technology, in a case in which a plurality of degenerate keys are generated, and the authentication is performed a plurality of times, writing having atomicity is unable to be performed.

In this regard, the information processing device 100 to which the information processing method according to the second embodiment is applied generates a synthesized degenerate key (a second degenerate key. Hereinafter referred to as a "re-degenerate key") obtained by synthesizing a plurality of degenerate keys (first degenerate keys) into one degenerate key. Further, the information processing device 100 performs the authentication process using the re-degenerate key as the authentication key.

Since the re-degenerate key is a key in which a plurality of degenerate keys are synthesized, the authentication using the re-degenerate key corresponds to "authentication using the degenerate key of the synthesis source being performed a plurality of times."

Therefore, as the authentication using the re-degenerate key according to the information processing method according to the second embodiment is performed, all the services corresponding to the degenerate key of the synthesis source become accessible.

Further, since the authentication using the re-degenerate key corresponds to "authentication using the degenerate key of the synthesis source being performed a plurality of times," writing having atomicity can be realized by single authentication using the re-degenerate key.

Therefore, according to the information processing device 100 to which the information processing method according to the second embodiment is applied, it is possible to improve the convenience of the authentication using the authentication key.

(2-2-2) Process According to Information Processing Method in Information Processing Device 100 According to Second Embodiment Next, an example of the process according to the information processing method in the information processing device 100 according to the second embodiment will be described.

The information processing device 100 generates the authentication key to be used in the authentication process.

More specifically, the information processing device 100 generates a plurality of first degenerate keys obtained by synthesizing a plurality of keys assigned to areas of the recording medium.

The first degenerate key is generated, for example, by sequentially performing encryption using each key on the value as the base such as a random number.

Here, the encryption schemes supported by a plurality of first degenerate keys may be identical to or different from one another. In other words, a plurality of encryption schemes may be included in encryption schemes supported by a plurality of first degenerate keys.

Then, the information processing device 100 generates a re-degenerate key (second degenerate key) obtained by synthesizing a plurality of generated first degenerate keys as the authentication key. The re-degenerate key is generated, for example, by performing encryption using a plurality of first degenerate keys. Further, the process related to the generation of the re-degenerate key is not limited to the example described above, and any arbitrary reversible calculation process capable of synthesizing a plurality of first degenerate keys and obtaining one re-degenerate key may be used.

FIG. 11 is an explanatory diagram illustrating a generation example of the authentication key according to the information processing method according to the second embodiment.

The information processing device 100 generates a degenerate key 1 (an example of the first degenerate key) by sequentially performing encryption using keys (an area key 1, a service key 2, and a service key 3 illustrated in FIG. 11) assigned to an area 1 of a recording medium on a random number (an example of the value serving as the basis) (S400).

The information processing device 100 generates a degenerate key 2 (another example of the first degenerate key) by sequentially performing encryption using keys (an area key 4, a service key 4, and a service key 6 illustrated in FIG. 11) assigned to an area 4 of the recording medium on a random number (an example of the value serving as the basis) (S402).

The information processing device 100 performs a calculation using the degenerate key 1 generated in step S400 and the degenerate key 2 generated in step S402 and generates the re-degenerate key (a second degenerate key) (S404). In the example illustrated in FIG. 11, the re-degenerate key generated in the process of step S404 corresponds to the authentication key.

For example, as illustrated in FIG. 11, the information processing device 100 generates a plurality of first degenerate keys and generates the re-degenerate key as the authentication key by synthesizing a plurality of generated first degenerate keys.

Further, the generation example of the authentication key according to the second embodiment is not limited to the example illustrated in FIG. 11.

For example, the example illustrated in FIG. 11 illustrates an example in which the two first degenerate keys are generated, but the information processing device 100 may generate three or more first degenerate keys and generate the re-degenerate key.

If the re-degenerate key (second degenerate key) is generated as the authentication key, the information processing device 100 performs the authentication process using the re-degenerate key.

Further, it will be appreciated that the information processing device 100 can perform the authentication process using the individual key such as the area key or the service key as the authentication key and perform the authentication process using the first degenerate key as the authentication key.

(2-3) Information Processing Method According to Third Embodiment (2-3-1) Overview of Information Processing System 1000 to which Information Processing Method According to the Third Embodiment is Applied As described in the information processing method according to the second embodiment, in a case in which the authentication using the degenerate key related to the technique disclosed in Patent Literature 1 is performed a plurality of times, only the service corresponding to the degenerate key used in the last authentication is accessible. Further, as described in the information processing method according to the second embodiment, in a case in which the authentication using a plurality of degenerate keys is performed a plurality of times in the existing technique, writing having atomicity is unable to be performed.

In this regard, the information processing device 100 to which the information processing method according to the third embodiment is applied controls a process related to an executable service in a case in which the authentication process is performed using the degenerate key as the authentication key.

More specifically, for example, in a case in which the authentication process is performed a plurality of times, the information processing device 100 causes a process related to a service authenticated in any one of the authentication processes to be executable.

Therefore, in a case in which the authentication according to the information processing method according to the third embodiment is performed, even when the authentication using the degenerate key is performed a plurality of times, all the services corresponding to the degenerate key used in a plurality of authentications are accessible.

Further, since all the services corresponding to the degenerate key used in a plurality of authentications are accessible, writing having atomicity can be realized.

Therefore, the information processing device 100 to which the information processing method according to the third embodiment is applied can improve the convenience of the authentication using the authentication key.

(2-3-2) Process According to Information Processing Method in Information Processing Device 100 According to Third Embodiment Next, an example of the process according to the information processing method in the information processing device 100 according to the third embodiment will be described. The information processing device 100 performs the authentication process using the degenerate key as the authentication key. Further, it will be appreciated that the information processing device 100 can perform the authentication process using an individual key such as an area key or a service key as the authentication key.

Further, the information processing device 100 controls execution of the process related to the service authenticated in the authentication process. The information processing device 100 controls the execution of the process related to the service, for example, by changing an accessible service in accordance with an authentication result.

For example, in a case in which the authentication process is performed a plurality of times, the information processing device 100 causes the process related to the service authenticated in any one of the authentication processes to be executable.

Here, the encryption schemes supported by the degenerate keys used in the authentication processes which are performed a plurality of times may be identical to or different from one another. In other words, a plurality of encryption schemes may be included in encryption schemes supported by a plurality of degenerate keys according to the third embodiment, similarly to the plurality of first degenerate keys according to the second embodiment.

FIG. 12 is an explanatory diagram for describing a process according to the information processing method according to the third embodiment.

The information processing device 100 generates a degenerate key 1 by sequentially performing encryption using keys (an area key 1, a service key 2, and a service key 3 illustrated in FIG. 12) assigned to an area 1 of a recording medium on a random number (an example of the value serving as the basis) (S500).

Then, the information processing device 100 performs authentication using the degenerate key 1 (S502). Since the degenerate key 1 is a degenerate key which is based on the service key 2 corresponding to the service 2 and the service key 3 corresponding to the service 3, the service 2 and the service 3 become accessible by the authentication using the degenerate key 1 in step S502.

The information processing device 100 generates a degenerate key 2 by sequentially performing encryption using keys (an area key 4, a service key 5, and a service key 6 illustrated in FIG. 12) assigned to an area 4 of the recording medium on a random number (an example of the value serving as the basis) (S504).

Then, the information processing device 100 performs authentication using the degenerate key 2 (S506).

Here, since the degenerate key 2 is a degenerate key which is based on the service key 5 corresponding to the service 5 and the service key 6 corresponding to the service 6, the service 5 and the service 6 are services which become accessible by the authentication using the degenerate key 2 in step S506. Further, the service 2 and the service 3 become accessible by the authentication using the degenerate key 1 in step S502.

Therefore, in the example illustrated in FIG. 12, in a case in which the authentication using the degenerate key 2 is performed in step S506, all the services (the service 2, the service 3, the service 5, and the service 6) which become accessible by the authentication using the degenerate key 1 and the authentication using the degenerate key 2 become services accessible in the information processing device 100.

In a case in which the authentication process is performed a plurality of times, the process related to the service authenticated in any one of the authentication processes is executable in the information processing device 100, for example, as illustrated in FIG. 12.

Further, the process according to the information processing method according to the third embodiment is not limited to the example described above.

For example, in a case in which the authentication process is performed a plurality of times, the information processing device 100 may change a process related to a service to be caused to be executable on the basis of a parameter of a command acquired from an external device before the authentication process is performed.

Specifically, the information processing device 100 changes a process related to a service to be caused to be executable to a "process related to a service authenticated in any one of the authentication processes" as in the example illustrated in FIG. 12 or a "process related to a service authenticated in an authentication process which has been performed most recently" as in a case in which the existing technology is used on the basis of the parameter of the command.

In other words, in the information processing system 1000 to which the information processing method according to the third embodiment is applied, it may be designated whether the accessible service is increased or replaced through a command parameter at the time of authentication.

(2-4) Information Processing Method According to Other Embodiments

The process according to the information processing method according to the present embodiment is not limited to the processes according to the information processing method according to the first to third embodiments.

For example, the process according to the information processing method according to the present embodiment may be a process obtained by combining two or more of the processes according to the information processing method according to the first to third embodiments.

(Program According to the Present Embodiment)

As a program causing a computer system to function as the information processing device according to the present embodiment (for example, a program capable of implementing some or all of the function of the processing unit 110 that performs the process according to the information processing method according to the first embodiment, the function of the processing unit 110 that performs the process according to the information processing method according to the second embodiment, and the function of the processing unit 110 that performs the process according to the information processing method according to the third embodiment) is executed by a processor or the like in the computer system, the convenience of the authentication using the authentication key can be improved. Here, a single computer or a plurality of computers may be used as the computer system according to the present embodiment. A series of processes is performed by the computer system according to the present embodiment.

Further, as the program causing the computer system to function as the information processing device according to the present embodiment is executed by the processor or the like in the computer system, the effects obtained by the process according to the information processing method according to of the respective embodiments described above can be obtained.

It should be understood by those skilled in the art that various modifications, combinations, sub-combinations and alterations may occur depending on design requirements and other factors insofar as they are within the scope of the appended claims or the equivalents thereof.

For example, the example (computer program) in which the program causing the computer system to function as the information processing device according to the present embodiment is provided has been described above, but in the present embodiment, a recording medium having the program stored therein can be provided together.

The above-described configuration indicates an example of the present embodiment, and it naturally belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device, including:

a processing unit configured to perform a calculation using keys assigned to a plurality of areas of a recording medium and generate an authentication key, in which the processing unit generates the authentication key by performing a calculation using conversion values corresponding to the keys, the conversion values being obtained by converting device-specific information using conversion methods associated with the keys used in the calculation.

(2)

The information processing device according to (1), in which the processing unit performs a calculation using the conversion value corresponding to the key used in the calculation each time the calculation using the key is performed.

(3)

The information processing device according to (1), in which the processing unit performs the calculation using the conversion values corresponding to the keys after the calculation using the key is performed.

(4)

The information processing device according to (1), in which the processing unit performs a calculation using a synthetic value obtained by synthesizing the conversion values corresponding to the keys after the calculation using the key is performed.

(5)

The information processing device according to any one of (1) to (4), in which the processing unit specifies a conversion method associated with each of the keys on the basis of setting information associated with the area.

(6)

The information processing device according to any one of (1) to (5), in which the conversion method includes not converting the device-specific information, and in a case in which the conversion method associated with one key indicates that the device-specific information is not converted, the processing unit does not perform a calculation using the conversion value corresponding to the one key.

(7)

An information processing device, including:

a processing unit configured to generate an authentication key used in an authentication process and perform the authentication process using the generated authentication key, in which the processing unit generates a plurality of first degenerate keys obtained by synthesizing a plurality of keys assigned to areas of a recording medium, generates a second degenerate key obtained by synthesizing the plurality of generated first degenerate keys, and performs the authentication process using the second degenerate key as the authentication key.

(8)

The information processing device according to (7), in which, in the processing unit, encryption schemes supported by the plurality of first degenerate keys are identical to one another.

(9)

The information processing device according to (7), in which, in the processing unit, a plurality of encryption schemes are included in the encryption schemes supported by the plurality of first degenerate keys.

(10)

An information processing device, including:

a processing unit configured to perform an authentication process using a degenerate key obtained by synthesizing a plurality of keys assigned to areas of a recording medium as an authentication key and control execution of a process related to a service authenticated in the authentication process, in which, in a case in which the authentication process is performed a plurality of times, the processing unit causes the process related to the service authenticated in any one of the authentication processes to be executable.

(11)

The information processing device according to (10), in which, in a case in which the authentication process is performed a plurality of times, the processing unit changes the process related to the service to be caused to be executable on the basis of a parameter of a command acquired from an external device before the authentication process is performed.

(12)

The information processing device according to (11), in which the processing unit changes the process related to the service to be caused to be executable to a process related to a service authenticated in any one of the authentication processes or a process related to a service authenticated in the authentication process which has been performed most recently on the basis of the parameter of the command.

(13)

An information processing method executed by an information processing device, including: performing a calculation using keys assigned to a plurality of areas of a recording medium and generating an authentication key, in which, in the generating of an authentication key, the authentication key is generated by performing a calculation using conversion values corresponding to the keys, the conversion values being obtained by converting device-specific information using conversion methods associated with the keys used in the calculation.

(14)

An information processing method executed by an information processing device, including: generating an authentication key used in an authentication process; and performing the authentication process using the generated authentication key, in which, in the generating of an authentication key, a plurality of first degenerate keys obtained by synthesizing a plurality of keys assigned to areas of a recording medium are generated, and a second degenerate key obtained by synthesizing the plurality of generated first degenerate keys is generated, and in the performing of the authentication process, the authentication process is performed using the second degenerate key as the authentication key.

(15)

An information processing method executed by an information processing device, including: performing an authentication process using a degenerate key obtained by synthesizing a plurality of keys assigned to areas of a recording medium as an authentication key; and controlling execution of a process related to a service authenticated in the authentication process, in which, in a case in which the authentication process is performed a plurality of times, in the controlling of execution, the process related to the service authenticated in any one of the authentication processes is caused to be executable.

(16)

A program causing a computer to implement:

a function of performing a calculation using keys assigned to a plurality of areas of a recording medium and generating an authentication key, in which the function of generating the authentication key includes generating the authentication key by performing a calculation using conversion values corresponding to the keys, the conversion values being obtained by converting device-specific information using conversion methods associated with the keys used in the calculation.

(17)

A program causing a computer to implement:

a function of generating an authentication key used in an authentication process; and a function of performing the authentication process using the generated authentication key, in which the generating function includes generating a plurality of first degenerate keys obtained by synthesizing a plurality of keys assigned to areas of a recording medium, and generating a second degenerate key obtained by synthesizing the plurality of generated first degenerate keys, and the function of performing the authentication process includes performing the authentication process using the second degenerate key as the authentication key.

(18)

A program causing a computer to implement:

a function of performing an authentication process using a degenerate key obtained by synthesizing a plurality of keys assigned to areas of a recording medium as an authentication key; and a function of controlling execution of a process related to a service authenticated in the authentication process, in which, in a case in which the authentication process is performed a plurality of times, the function of controlling execution includes causing the process related to the service authenticated in any one of the authentication processes to be executable.

REFERENCE SIGNS LIST 100 information processing device
200 reader/writer
300 server
102 first communication unit
104 second communication unit
106 control unit
110 processing unit
1000 information processing system

The invention claimed is:

1. An information processing device, comprising:
a processing unit configured to:
perform a first calculation using keys assigned to a plurality of areas of a recording medium;
generate a synthetic value based on synthesis of conversion values corresponding to the keys, wherein the conversion values are obtained based on conversion of device-specific information using a conversion method associated with each of the keys;
perform a second calculation based on an output of the first calculation and the synthetic value; and
generate an authentication key based on an output of the second calculation.

2. The information processing device according to claim 1, wherein the processing unit is further configured to specify the conversion method associated with each of the keys based on setting information associated with the plurality of areas.

3. The information processing device according to claim 1, wherein
the conversion method further includes a method based on non-conversion of the device-specific information, and
the processing unit is further configured to not perform a calculation using conversion value corresponding to a specific key when the conversion method associated with specific key indicates that the device-specific information is not converted.

4. An information processing device, comprising:
a processing unit configured to:
synthesize a plurality of keys assigned to a plurality of areas of a recording medium;
generate a plurality of degenerate keys based on the synthesis of the plurality of keys;
synthesize the plurality of generated degenerate keys;
generate a re-degenerate key based on the synthesis of the plurality of generated degenerate keys; and
perform an authentication process based on the generated re-degenerate key, wherein the re-degenerate key is used as an authentication key in the authentication process.

5. The information processing device according to claim 4, wherein, in the processing unit, encryption schemes supported by the plurality of first degenerate keys are identical to one another.

6. The information processing device according to claim 4, wherein, in the processing unit, a plurality of encryption schemes are included in the encryption schemes supported by the plurality of degenerate keys.

7. An information processing device, comprising:
a processing unit configured to:
synthesize a first plurality of keys assigned to areas of a recording medium;
generate, as an authentication key, a first degenerate key based on the synthesis of the first plurality of keys;

synthesize a second plurality of keys assigned to the areas of the recording medium;

generate, as the authentication key, a second degenerate key based on the synthesis of the second plurality of keys, wherein the second degenerate key is generated subsequent to the first degenerate key;

control execution of a first authentication process based on the first degenerate key;

control execution of a second authentication process based on the second degenerate key; and control execution of a first process related to a first service authenticated in the first authentication process, wherein the first process related to the first service is further authenticated in any one of the second authentication process, based on the execution of the first authentication process.

8. The information processing device according to claim 7, wherein the processing unit is further configured to control execution of the process related to the first service based on a parameter of a command acquired from an external device before execution of each of the first authentication process and the second authentication process.

9. The information processing device according to claim 8, wherein the processing unit is further configured to change the first process related to the first service to a second process related to a second service authenticated in the second authentication process, wherein the second authentication process is executed after the first authentication process, and the second authentication process is executed based on the parameter of the command.

10. An information processing method executed by an information processing device, comprising:

performing a first calculation using keys assigned to a plurality of areas of a recording medium;

generating a synthetic value based on synthesis of conversion values corresponding to the keys, wherein the conversion values are obtained based on conversion of device-specific information using a conversion method associated with each of the keys;

performing a second calculation based on an output of the first calculation and the synthetic value; and generating an authentication key based on an output of the second calculation.

11. An information processing method executed by an information processing device, comprising:

synthesizing a plurality of keys assigned to a plurality of areas of a recording medium;

generating a plurality of degenerate keys based on the synthesis of the plurality of keys;

synthesizing the plurality of generated degenerate keys;

generating a re-degenerate key based on the synthesis of the plurality of generated degenerate keys; and performing an authentication process based on the generated re-degenerate key, wherein the re-degenerate key is used as an authentication key in the authentication process.

12. An information processing method executed by an information processing device, comprising:

synthesizing a first plurality of keys assigned to areas of a recording medium;

generating, as an authentication key, a first degenerate key based on the synthesis of the first plurality of keys;

synthesizing a second plurality of keys assigned to the areas of the recording medium;

generating, as the authentication key, a second degenerate key based on the synthesis of the second plurality of keys, wherein the second degenerate key is generated subsequent to the first degenerate key;

controlling execution of a first authentication process based on the first degenerate key;

controlling execution of a second authentication process based on the second degenerate key; and controlling execution of a process related to a service authenticated in the first authentication process, wherein the process related to the service is further authenticated in the second authentication process, based on the execution of the first authentication process.

13. A non-transitory computer-readable medium having stored thereon, computer-executable instructions which, when executed by a processor, cause the processor to execute operations, the operations:

performing a first calculation using keys assigned to a plurality of areas of a recording medium;

generating a synthetic value based on synthesis of conversion values corresponding to the keys, wherein the conversion values are obtained based on conversion of device-specific information using a conversion method associated with each of the keys;

performing a second calculation based on an output of the first calculation and the synthetic value; and generating an authentication key based on an output of the second calculation.

14. A non-transitory computer-readable medium having stored thereon, computer-executable instructions which, when executed by a processor, cause the processor to execute operations, the operations:

synthesizing a plurality of keys assigned to a plurality of areas of a recording medium;

generating a plurality of degenerate keys based on the synthesis of the plurality of keys;

synthesizing the plurality of generated degenerate keys;

generating a re-degenerate key based on the synthesis of the plurality of generated degenerate keys; and performing an authentication process based on the generated re-degenerate key, wherein the re-degenerate key is used as an authentication key in the authentication process.

15. A non-transitory computer-readable medium having stored thereon, computer-executable instructions which, when executed by a processor, cause the processor to execute operations, the operations:

synthesizing a first plurality of keys assigned to areas of a recording medium;

generating, as an authentication key, a first degenerate key based on the synthesis of the first plurality of keys;

synthesizing a second plurality of keys assigned to the areas of the recording medium;

generating, as the authentication key, a second degenerate key based on the synthesis of the second plurality of keys, wherein the second degenerate key is generated subsequent to the first degenerate key;

controlling execution of a first authentication process based on the first degenerate key;

controlling execution of a second authentication process based on the second degenerate key; and controlling execution of a process related to a service authenticated in the first authentication process, wherein the process related to the service is further authenticated in the second authentication process, based on the execution of the first authentication process.

16. An information processing device, comprising:
a processing unit configured to:
- perform a first calculation based on a first key, of a plurality of keys, assigned to a first area of a plurality of areas of a recording medium;
- perform a second calculation based on synthesis of the first calculation and a first conversion value corresponding to the first key, wherein the first conversion value is obtained based on conversion of device-specific information using a conversion method associated with the first key;
- perform a third calculation based on synthesis of the second calculation and a second key of the plurality of keys;
- perform a fourth calculation based on synthesis of the third calculation and a second conversion value corresponding to the second key, wherein the second conversion value is obtained based on conversion of device-specific information using a conversion method associated with the second key; and
- generate an authentication key based on an output of the fourth calculation.

17. An information processing device, comprising:
a processing unit configured to:
- perform a first calculation using a plurality of keys assigned a plurality of areas of a recording medium; and
- perform a second calculation based on a plurality of conversion values corresponding to the plurality of keys, wherein
  - the second calculation is performed after the first calculation using each of the plurality of keys, and
  - the plurality of conversion values is obtained based on conversion of device-specific information using a conversion method associated with the key; and
- generate an authentication key based on an output of the second calculation.

* * * * *